United States Patent
Ishikawa et al.

(10) Patent No.: US 6,442,702 B1
(45) Date of Patent: Aug. 27, 2002

(54) ON-VEHICLE COMPUTER HAVING FUNCTION OF PROTECTING VEHICULAR BATTERY

(75) Inventors: Wataru Ishikawa; Nobuhiro Hamba, both of Yokohama; Masaru Iyama, Ebina; Atushi Nakamura, Tokyo; Kenichi Shishikura, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/370,898

(22) Filed: Aug. 10, 1999

(30) Foreign Application Priority Data

Feb. 5, 1999 (JP) ............................................ 11-029088

(51) Int. Cl.[7] .............................. G06F 1/26; H02J 7/00; B60R 16/02
(52) U.S. Cl. ......................... 713/340; 701/1; 340/636; 702/63
(58) Field of Search ................................. 713/300, 323, 713/340; 320/104; 701/1; 340/635, 636; 702/63; 307/66, 130, 140; 700/293

(56) References Cited

U.S. PATENT DOCUMENTS

| 5,375,230 A | 12/1994 | Fujimori |
| 5,379,436 A | 1/1995 | Tanaka |
| 5,408,423 A | 4/1995 | Kawagishi |
| 5,450,003 A | * 9/1995 | Cheon |
| 5,560,023 A | 9/1996 | Crump et al. |
| 5,862,394 A | 1/1999 | Watts et al. |

| 6,191,505 B1 | * 2/2001 | Matsuyama |
| 6,310,556 B1 | * 10/2001 | Green et al. |

FOREIGN PATENT DOCUMENTS

| JP | 8-194561 | 7/1996 |
| JP | 10-27044 | 1/1998 |

* cited by examiner

Primary Examiner—Gopal C. Ray
(74) Attorney, Agent, or Firm—Louis Woo

(57) ABSTRACT

An on-vehicle computer includes a hardware timer. The hardware timer is started when a vehicle accessory switch changes to its OFF position. A suspending request is transmitted from a BIOS to an application program and a BIOS timer is started when the vehicle accessory switch changes to its OFF position. A suspending permission answer is returned from the application program to the BIOS and an application program timer is started in response to the suspending request. A first turn-OFF command is generated when an elapsed time measured by the application program timer reaches a first predetermined time interval (T2). The BIOS is enabled to generate a suspending command in response to the suspending permission answer. A second turn-OFF command is generated in cases where the suspending permission answer continuously fails to be returned to the BIOS until an elapsed time measured by the BIOS timer reaches a second predetermined time interval (T1). Power supply to the main computer portion is turned off in response to at least one of the first turn-OFF command and the second turn-OFF command. Power supply to the main computer portion is turned off in cases where the BIOS continuously fails to generate the suspending command and the first turn-OFF command and the second turn-OFF command continuously fail to be generated until an elapsed time measured by the hardware timer reaches a third predetermined time interval (T3).

9 Claims, 11 Drawing Sheets

ON-VEHICLE COMPUTER HAVING FUNCTION OF PROTECTING VEHICULAR BATTERY

BACKGROUND OF THE INVENTION

1. Field of the Invention

This invention generally relates to an on-vehicle computer.

This invention particularly relates to an on-vehicle computer having a function of protecting a vehicular battery, for example, a function of preventing a vehicular battery from being excessively discharged by the occurrence of a problem such as a hang-up in a computer routine.

2. Description of the Related Art

A typical automotive vehicle has on-vehicle electric apparatuses such as a radio receiver and a stereophonic audio system. The on-vehicle electric apparatuses are powered by DC (direct current) energy from a vehicular battery. The positive side of the DC power is called "+B". The on-vehicle electric apparatuses are turned on and off by actuating an ACC (accessory) switch of the vehicle.

The voltage of a vehicular electric power supply formed by a vehicular battery tends to be unstable when a related vehicle is in operation. Generally, the power supply voltage repetitively drops and rises. In some cases, the power supply voltage drops below an acceptable minimum level required to normally operate on-vehicle electric apparatuses.

In the case where an on-vehicle electric apparatus is a radio receiver or a stereophonic audio system, it is good to provide the electric apparatus with a power supply backup which can deal with an excessive power-supply voltage drop for several seconds. If the power supply voltage continues to be excessively low for longer than several seconds before returning to a normal range, operation of the radio receiver or the stereophonic audio system is temporarily interrupted. After the interruption, the radio receiver or the stereophonic audio system is reset and restarted. The reset and restart spend a time interval of a few seconds to about ten seconds. Usually, the interruption and the following restart of the radio receiver or the stereophonic audio system does not cause any serious problem.

A computer system using a recording medium disc and a lengthy OS (operating system) spends a long time to start its operation after a power supply switch thereof is changed to an ON position. The starting time of such a computer system is equal to several times or several tens of times of the starting time of a radio receiver or a stereophonic audio system. Therefore, the computer system is unsuited for on-vehicle use since a power supply voltage thereto frequently drops below an acceptable minimum level while a related vehicle is in operation.

In the computer system, processes of writing and reading data into and from the recording medium disc include mechanical steps which tend to be adversely affected by mechanical vibration. Also in this regard, the computer system is unsuited for on-vehicle use. It should be noted that the on-vehicle computer is subjected to mechanical vibration while a related vehicle is in operation.

A prior-art on-vehicle computer has a casing designed to cut off vibration travelling from a vehicle body toward the inner portion of the computer. The prior-art on-vehicle computer is equipped with an auxiliary battery which maintains operation of the computer when a power supply voltage generated by a vehicular battery drops below an acceptable minimum level.

When a power supply switch of the prior-art on-vehicle computer is changed to an OFF position, the computer implements a process of ending a program and then the computer is actually turned off. In the case where a hang-up occurs in the program, the prior-art on-vehicle computer can not be turned off even when the power supply switch is changed to its OFF position. In this case, the computer continues to consume electric power at a significant rate, and there is a chance that the vehicular battery is excessively discharged. The engine of an automotive vehicle may stop if the vehicular battery is excessively discharged.

U.S. Pat. No. 5,560,023 corresponding to Japanese published unexamined patent application 8-194561 discloses a desktop computer system having a system suspend/resume capability that causes the system to enter the suspend state when the operating system's APM driver ceases functioning. The computer system of U.S. Pat. No. 5,560,023 has a CPU, a nonvolatile storage device, volatile registers and memory data, a power management processor, a backup suspend timer and a power supply in circuit communication. The power management processor controls the regulation of power to the CPU by the power supply. The suspend/resume system is controlled by an operating system having power management control. The backup suspend timer executes independently of the power management portion of the operating system. The backup suspend timer causes the system to suspend if the power management portion of the operating system ceases functioning and the system should otherwise be suspended.

U.S. Pat. No. 5,862,394 corresponding to Japanese published unexamined patent application 10-27044 discloses a system and method of intelligently terminating power to a computing device. According to the system and method in U.S. Pat. No. 5,862,394, after a software control program starts, a timer circuit gets set. Once the timer circuit gets set, the timer proceeds until timed out. In addition, the software control program initiates an orderly shut down procedure concurrently. The software control program first starts a software shut down process and a hardware shut down process. The software control program has to be able to reset the timer circuit before it times out if additional time is needed to complete the shut down process. Finally, after the timer circuit has timed out, the orderly termination of power to the system begins. In addition, the software control program is implemented to set the timer value to time out instantly if the shut down process is complete.

SUMMARY OF THE INVENTION

It is an object of this invention to provide an improved one vehicle computer.

A first aspect of this invention provides an on-vehicle computer comprising first means for detecting whether or not a vehicle accessory switch changes to its OFF position; a hardware timer; second means for starting the hardware timer when the first means detects that the vehicle accessory switch changes to its OFF position; third means for providing a BIOS timer; fourth means for transmitting a suspending request from a BIOS to an application program and starting the BIOS timer when the first means detects that the vehicle accessory switch changes to its OFF position; fifth means for providing an application program timer; sixth means for returning a suspending permission answer from the application program to the BIOS and starting the application program timer in response to the suspending request; seventh means for generating a first turn-OFF command when an elapsed time measured by the application program timer reaches a first predetermined time interval (T2); eighth means for enabling the BIOS to generate a suspending command in response to the suspending permission answer; ninth means for generating a second turn-OFF command in cases where the sixth means continues to fail to return the suspending permission answer to the BIOS until an elapsed time measured by the BIOS timer reaches a second predetermined time interval (T1); a main computer portion; tenth means for turning off power supply to the main computer portion in response to at least one of the first turn-OFF command and the second turn-OFF command; and eleventh means for turning off power supply to the main computer portion in cases where the BIOS continues to fail to generate the suspending command and the seventh means and the ninth means continue to fail to generate the first turn-OFF command and the second turn-OFF command until an elapsed time measured by the hardware timer reaches a third predetermined time interval (T3); wherein the first predetermined time interval (T2) is longer than the second predetermined time interval (T1), and is shorter than the third predetermined time interval (T3).

A second aspect of this invention provides an on-vehicle computer comprising first means for detecting whether or not at least one of a vehicular-battery voltage and an internal-battery voltage continues to be lower than a predetermined reference voltage for a first predetermined time interval; a hardware timer; second means for starting the hardware timer when the first means detects that at least one of the vehicular-battery voltage and the internal-battery voltage continues to be lower than the predetermined reference voltage for the first predetermined time interval; third means for providing a BIOS timer; fourth means for transmitting a shutting-down request from a BIOS to an application program and starting the BIOS timer when the first means detects that at least one of the vehicular-battery voltage and the internal-battery voltage continues to be lower than the predetermined reference voltage for the first predetermined time interval; fifth means for returning a shutting-down permission answer from the application program to the BIOS; sixth means for enabling the BIOS to generate a shutting-down command in response to the shutting-down permission answer; seventh means for generating a turn-OFF command in cases where the fifth means continues to fail to return the shutting-down permission answer to the BIOS until an elapsed time measured by the BIOS timer reaches a second predetermined time interval (T1); a main computer portion; eighth means for turning off power supply to the main computer portion in response to the turn-OFF command; and ninth means for turning off power supply to the main computer portion in cases where the BIOS continues to fail to generate the shutting-down command and the seventh means continues to fail to generate the turn-OFF command until an elapsed time measured by the hardware timer reaches a third predetermined time interval (T3); wherein the second predetermined time interval (T1) is shorter than the third predetermined time interval (T3).

A third aspect of this invention provides an on-vehicle computer comprising first means for detecting whether or not the computer is in its suspended state; second means means for, in cases where the first means detects that the computer is in its suspended state, detecting whether or not at least one of a vehicular-battery voltage and an internal-battery voltage continues to be lower than a predetermined reference voltage for a first predetermined time interval; a hardware timer; third means for starting the hardware timer when the second means detects that at least one of the vehicular-battery voltage and the internal-battery voltage continues to be lower than the predetermined reference voltage for the first predetermined time interval; fourth means for providing a BIOS timer; fifth means for transmitting a shutting-down request from a BIOS to an application program and starting the BIOS timer when the second means detects that at least one of the vehicular-battery voltage and the internal-battery voltage continues to be lower than the predetermined reference voltage for the first predetermined time interval; sixth means for returning a shutting-down permission answer from the application program to the BIOS; seventh means for enabling the BIOS to generate a shutting-down command in response to the shutting-down permission answer; eighth means for generating a turn-OFF command in cases where the sixth means continues to fail to return the shutting-down permission answer to the BIOS until an elapsed time measured by the BIOS timer reaches a second predetermined time interval (T1); a main computer portion; ninth means for turning off power supply to the main computer portion in response to the turn-OFF command; and tenth means for turning off power supply to the main computer portion in cases where the BIOS continues to fail to generate the shutting-down command and the eighth means continues to fail to generate the turn-OFF command until an elapsed time measured by the hardware timer reaches a third predetermined time interval (T3); wherein the second predetermined time interval (T1) is shorter than the third predetermined time interval (T3).

A fourth aspect of this invention provides an on-vehicle computer comprising first means for detecting whether or not a vehicle accessory switch changes to its OFF position; a main computer portion including a CPU; second means for enabling the CPU to output a suspending command when the first means detects that the vehicle accessory switch changes to its OFF position; and third means for cutting off power supply to the main computer portion in cases where the CPU continuously fails to output the suspending command during a predetermined time interval after the first means detects that the vehicle accessory switch changes to its OFF position.

A fifth aspect of this invention provides an on-vehicle computer comprising a power-supply management portion operating in accordance with a first program; first means provided in the power-supply management portion for detecting whether or not a vehicle accessory switch changes to its OFF position; a main computer portion including a CPU which operates in accordance with a second program different and separate from the first program; second means provided in the power-supply management portion for feeding the CPU with information representing that the vehicle accessory switch changes to its OFF position; third means for enabling the CPU to return a suspending command to the power-supply management portion in response to the information from the second means; a power-supply controller for controlling power supply to the main computer portion; and fourth means provided in the power-supply management portion for controlling the power-supply controller to cut off power supply to the main computer portion in cases where the CPU continuously fails to return the suspending command during a predetermined time interval after the first means detects that the vehicle accessory switch changes to its OFF position.

A sixth aspect of this invention provides an on-vehicle computer comprising first means for detecting whether or not a vehicular-battery voltage continues to be lower than a predetermined reference voltage for a first predetermined time interval; a main computer portion including a CPU; second means for enabling the CPU to output a shutting-down command when the first means detects that the vehicular-battery voltage continues to be lower than the predetermined reference voltage for the first predetermined time interval; and third means for cutting off power supply to the main computer portion in cases where the CPU continuously fails to output the shutting-down command during a second predetermined time interval after the first means detects that the vehicular-battery voltage continues to be lower than the predetermined reference voltage for the first predetermined time interval.

A seventh aspect of this invention provides an on-vehicle computer comprising a power-supply management portion operating in accordance with a first program; first means provided in the power-supply management portion for detecting whether or not a vehicular-battery voltage continues to be lower than a predetermined reference voltage for a first predetermined time interval; a main computer portion including a CPU which operates in accordance with a second program different and separate from the first program; second means provided in the power-supply management portion for feeding the CPU with information representing that the vehicular-battery voltage continues to be lower than the predetermined reference voltage for the first predetermined time interval; third means for enabling the CPU to return a shutting-down command to the power-supply management portion in response to the information from the second means; a power-supply controller for controlling power supply to the main computer portion; and fourth means provided in the power-supply management portion for controlling the power-supply controller to cut off power supply to the main computer portion in cases where the CPU continuously fails to return the shutting-down command during a second predetermined time interval after the first means detects that the vehicular-battery voltage continues to be lower than the predetermined reference voltage for the first predetermined time interval.

An eighth aspect of this invention provides an on-vehicle computer comprising first means for detecting whether or not the computer is in its suspended state; second means means for, in cases where the first means detects that the computer is in its suspended state, detecting whether or not a vehicular-battery voltage continues to be lower than a predetermined reference voltage for a first predetermined time interval; a main computer portion including a CPU; third means for enabling the CPU to output a shutting-down command when the second means detects that the vehicular-battery voltage continues to be lower than the predetermined reference voltage for the first predetermined time interval; and fourth means for cutting off power supply to the main computer portion in cases where the CPU continuously fails to output the shutting-down command during a second predetermined time interval after the second means detects that the vehicular-battery voltage continues to be lower than the predetermined reference voltage for the first predetermined time interval.

A ninth aspect of this invention provides an on-vehicle computer comprising a power-supply management portion operating in accordance with a first program; first means provided in the power-supply management portion for detecting whether or not the computer is in its suspended state; second means means provided in the power-supply management portion for, in cases where the first means detects that the computer is in its suspended state, detecting whether or not a vehicular-battery voltage continues to be lower than a predetermined reference voltage for a first predetermined time interval; a main computer portion including a CPU which operates in accordance with a second program different and separate from the first program; third means provided in the power-supply management portion for feeding the CPU with information representing that the vehicular-battery voltage continues to be lower than the predetermined reference voltage for the first predetermined time interval; fourth means for enabling the CPU to return a shutting-down command to the power-supply management portion in response to the information from the third means; a power-supply controller for controlling power supply to the main computer portion; and fifth means provided in the power-supply management portion for controlling the power-supply controller to cut off power supply to the main computer portion in cases where the CPU continuously fails to return the shutting-down command during a second predetermined time interval after the second means detects that the vehicular-battery voltage continues to be lower than the predetermined reference voltage for the first predetermined time interval.

DESCRIPTION OF THE PREFERRED EMBODIMENTS

First Embodiment

Figure 1:
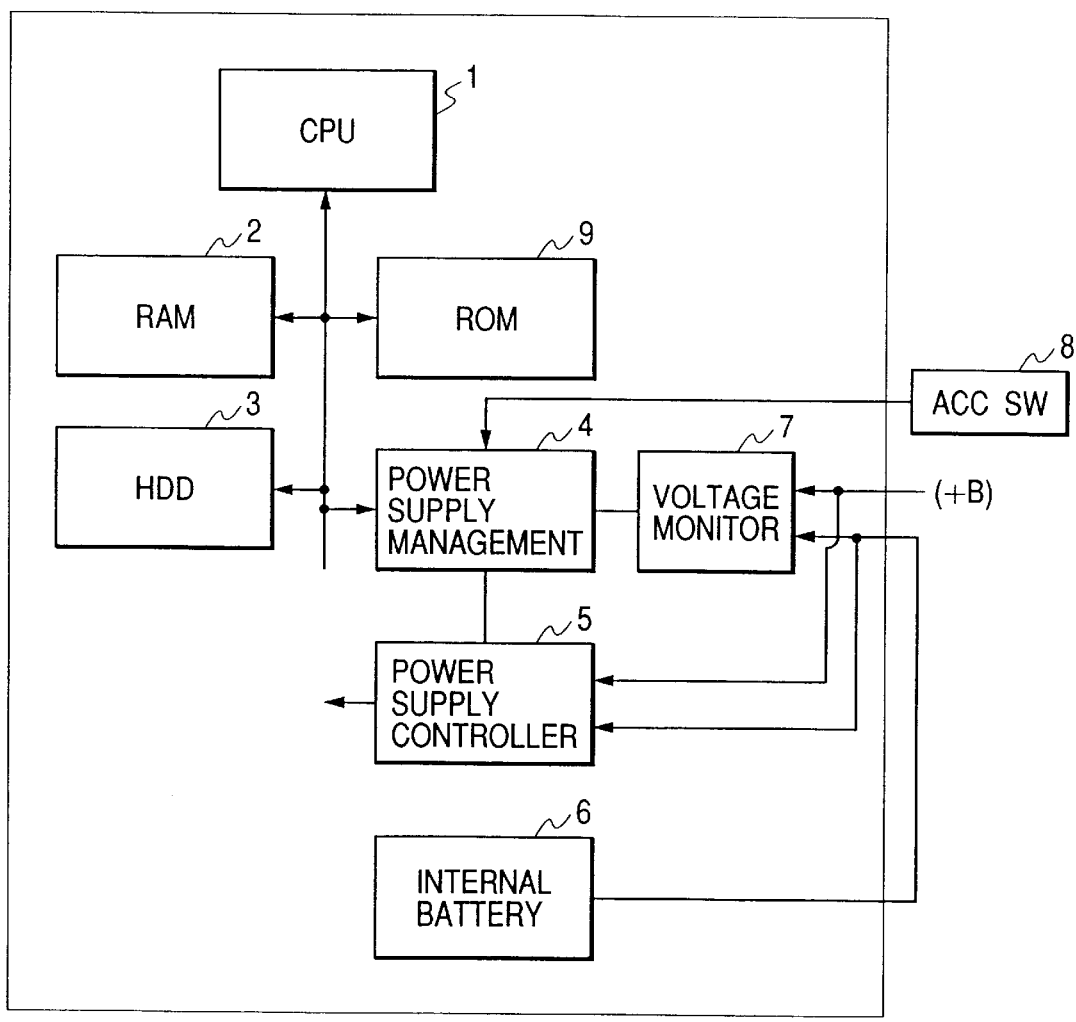
FIG. 1 is a block diagram of an on-vehicle computer according to a first embodiment of this invention.

FIG. 1 shows a block diagram of an on-vehicle computer according to a first embodiment of this invention. The on-vehicle computer of FIG. 1 includes a CPU 1, a main memory 2, a hard disc drive 3, a power-supply management portion 4, and a ROM (a read only memory) 9 which are connected via a bus.

The main memory 2 includes a RAM (a random access memory). The ROM 9 stores a program called a BIOS (a basic input/output system). The CPU 1 can refer to the BIOS. The hard disc drive 3 contains a recording disc called a hard disc. An OS (operating system), a driver (a device driver program), and an application program are stored in the recording disc in the hard disc drive 3. The CPU 1 can refer to the OS, the driver, and the application program via the hard disc drive 3. The application program is based on the OS and the driver.

The power-supply management portion 4 is connected to a vehicle ACC switch 8. The power-supply management portion 4 includes a register loaded with a signal representing a state of the ACC switch 8. The power-supply management portion 4 also includes a register loaded with a signal which represents whether or not the computer is in a suspended state (a suspended mode of operation). The ACC-state register and the suspended-state register can be accessed by the CPU 1. The power-supply management portion 4 further includes a hardware timer formed by a counter. In addition, the power-supply management portion 4 includes a programmable logic device or a processor which operates in accordance with a power-supply management program stored in an internal ROM. The programmable logic device is connected to the ACC switch 8, the ACC-state register, the suspended-state register, and the hardware timer.

A power-supply controller 5 is connected to the power-supply management portion 4. The power-supply controller 5 is connected to a power feed line in the computer. The power-supply controller 5 is connected to a "+B" line leading from a vehicular battery (not shown). The power-supply controller 5 includes a switch for controlling the supply of electric power to a main portion of the computer. The main portion of the computer contains the CPU 1 and the main memory 2.

The on-vehicle computer of FIG. 1 includes an internal battery (an auxiliary battery) 6 and a voltage monitoring portion 7. The internal battery 6 is connected to the power-supply controller 5 and the voltage monitoring portion 7. The voltage monitoring portion 7 is connected to the power-supply management portion 4. The voltage monitoring portion 7 is connected to the "+B" line. The voltage monitoring portion 7 includes a first sensor for detecting a voltage at the "+B" line. The voltage monitoring portion 7 informs the power-supply management portion 4 of the detected "+B" line voltage. The voltage monitoring portion 7 includes a second sensor for detecting a voltage across the internal battery 6. The voltage monitoring portion 7 informs the power-supply management portion 4 of the detected internal-battery voltage.

The main portion of the on-vehicle computer can be fed with electric power from at least one of the "+B" line and the internal battery 6 via the power-supply controller 5. The on-vehicle computer is changed among an OFF state, a normal ON state (a normal operation state), and a suspended state in accordance with operation of the power-supply controller 5.

Figure 2:
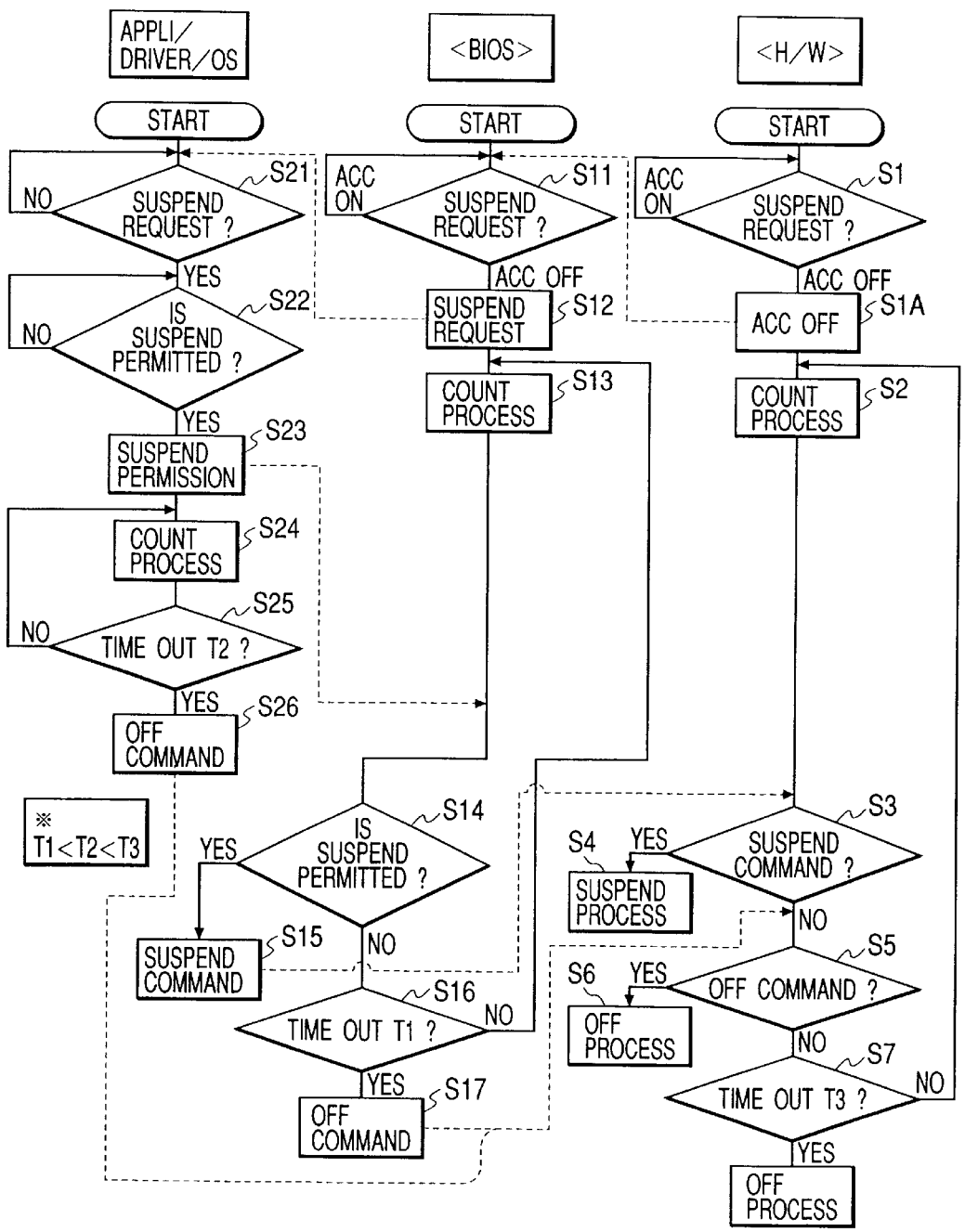
FIG. 2 is a set of flowcharts of program segments in the on-vehicle computer in FIG. 1.

An explanation will be given of a change of the on-vehicle computer from its ON state to its suspended state. The right-hand portion <H/W> of FIG. 2 is a flowchart of a segment of the power-supply management program for controlling the power-supply management portion 4. As shown in FIG. 2, a first step S1 of the power-supply management program segment decides whether or not the ACC switch 8 changes to its OFF position. When the ACC switch 8 does not change to its OFF position, the step S1 is repeated. When the ACC switch 8 changes to its OFF position, the program advances from the step S1 to a step S1A.

The step S1A loads the ACC-state register with a signal representing an ACC_OFF state. After the step S1A, the program advances to a step S2.

The step S2 implements a counting process. Specifically, the step S2 starts the hardware timer in the power-supply management portion 4, or increments the elapsed time (the time-representing number) indicated by the hardware timer.

A step S3 following the step S2 decides whether or not a suspending command is present. The suspending command is given by the BIOS. When the suspending command is present, the program advances from the step S3 to a step 34. When the suspending command is not present, the program advances from the step S3 to a step S5.

The step S4 controls the power-supply controller 5, and thereby changes the computer to its suspended state. The step S4 loads the suspended-state register with a signal representing that the computer is in its suspended state. After the step S4, the current execution cycle of the power-supply management program segment ends.

The step S5 decides whether or not at least one of two turn-OFF commands (two shut-down commands) is present. The turn-OFF commands are given by the BIOS and the application program. When at least one of the turn-OFF commands is present, the program advances from the step S5 to a step S6. When any turn-OFF command is not present, the program advances from the step S5 to a step S7.

The step S6 controls the power-supply controller 5, and thereby changes the computer to its OFF state. Then, the step S6 resets or stops the hardware timer. After the step S6, the current execution cycle of the power-supply management program segment ends.

The step S7 compares the elapsed time indicated by the hardware timer with a predetermined time interval T3. When the elapsed time indicated by the hardware timer reaches the predetermined time interval T3, the program advances from the step S7 to a step S8. Otherwise, the program returns from the step S7 to the step S2.

The step S8 controls the power-supply controller 5, and thereby changes the computer to its OFF state. After the step S8, the current execution cycle of the power-supply management program segment ends.

The intermediate portion <BIOS> of FIG. 2 is a flowchart of a segment of the BIOS for controlling the CPU 1. As shown in FIG. 2, a first step S11 of the BIOS segment accesses the ACC-state register in the power-supply management portion 4, and decides whether or not the signal in the ACC-state register represents the ACC_OFF state. When the signal in the ACC-state register represents the ACC_OFF state, the program advances from the step S11 to a step S12. When the signal in the ACC-state register does not represent the ACC_OFF state, the step S11 is repeated.

The step S12 transmits a suspending-request message to the application program. After the step S12, the program advances to a step S13.

The step S13 implements a counting process. Specifically, the step S13 starts a software timer (a BIOS timer or a timer provided by the BIOS), or increments the elapsed time (the time-representing number) indicated by the software timer.

A step S14 following the step S13 decides whether or not a suspending process is permitted. Information of whether or not the suspending process is permitted is given by the application program. When the suspending process is permitted, the program advances from the step S14 to a step S15. When the suspending process is not permitted, the program advances from the step S14 to a step S16.

The step S15 generates a suspending command. The step S15 transmits the suspending command to the power-supply management portion 4. Then, the step S15 resets or stops the software timer. After the step S15, the current execution cycle of the BIOS segment ends.

The step S16 compares the elapsed time indicated by the software timer with a predetermined time interval T1. Preferably, the predetermined time interval T1 is shorter than the predetermined time interval T3. When the elapsed time indicated by the software timer reaches the predetermined time interval T1, the program advances from the step S16 to a step S17. Otherwise, the program returns from the step S16 to the step S13.

The step S17 generates a turn-OFF command. The step S17 transmits the turn-OFF command to the power-supply management portion 4. After the step S17, the current execution cycle of the BIOS segment ends.

The left-hand portion <APPLI/DRIVER/OS> of FIG. 2 is a flowchart of a segment of the OS-driver-based application program for controlling the CPU 1. The application program segment in FIG. 2 is periodically executed by, for example, an interruption process. As shown in FIG. 2, a first step S21 of the application program segment decides whether or not a suspending-request message is present. The suspending-request message is transmitted from the BIOS. When the suspending-request message is present, the program advances from the step S21 to a step S22. When the suspending-request message is not present, the step S21 is repeated.

The step S22 decides whether or not a suspending process is permitted. When the suspending process is permitted, the program advances from the step S22 to a step S23. When the suspending process is not permitted, the step S22 is repeated.

The step S23 informs the BIOS that the suspending process is permitted. After the step S23, the program advances to a step S24.

The step S24 implements a counting process. Specifically, the step S24 starts a software timer (an application program timer or a timer provided by the application program), or increments the elapsed time (the time-representing number) indicated by the software timer.

A step S25 following the step S24 compares the elapsed time indicated by the software timer with a predetermined time interval T2. Preferably, the predetermined time interval T2 is shorter than the predetermined time interval T3, and is longer than the predetermined time interval T1. When the elapsed time indicated by the software timer reaches the predetermined time interval T2, the program advances from the step S25 to a step S26. Otherwise, the program returns from the step S25 to the step S24.

The step S26 generates a turn-OFF command. The step S26 transmits the turn-OFF command to the power-supply management portion 4. After the step S26, the current execution cycle of the application program segment ends.

During the period of time between the moment of start of the hardware timer and the moment at which the elapsed time indicated by the hardware timer reaches the predetermined time interval T3, when the power-supply management portion 4 receives a suspending command from the BIOS, the power-supply management portion 4 controls the power-supply controller 5 and thereby changes the computer to its suspended state. In addition, the power-supply management portion 4 loads the suspended-state register with a signal representing that the computer is in its suspended state.

During the period of time between the moment of start of the hardware timer and the moment at which the elapsed time indicated by the hardware timer reaches the predetermined time interval T3, when the power-supply management portion 4 receives at least one of turn-OFF commands (shut-down commands) from the BIOS and the application program, the power-supply management portion 4 controls the power-supply controller 5 and thereby changes the computer to its OFF state. In addition, the power-supply management portion 4 resets or stops the hardware timer.

In the case where the power-supply management portion 4 continues to receive neither a suspending command nor a turn-OFF command and then the elapsed time indicated by the hardware timer reaches the predetermined time interval T3, the power-supply management portion 4 controls the power-supply controller 5 and thereby changes the computer to its OFF state.

It is preferable to set the predetermined time intervals T1, T2, and T3 as "T1<T2<T3". According to this setting, 3-stage fail-safe can be implemented. In the case where the computer operates normally, when the ACC switch 8 is changed to its OFF state, the power-supply management program informs the BIOS of the ACC_OFF state and the BIOS transmits the suspending-request message to the OS-driver-based application program. Then, the OS-driver-based application program returns the information to the BIOS which indicates that the suspending process is permitted. The BIOS transmits the suspending command to the power-supply management portion 4 in response to the return information from the OS-driver-based application program. The power-supply management portion 4 controls the power-supply controller 5 in response to the suspending command, and thereby changes the computer to its suspended state. When the computer is in its suspended state, the OS is in its stand-by state and the application program is set aboard. The computer being in its suspended state consumes electric power at only a small rate, and the vehicular battery is hardly discharged excessively. When the ACC switch 8 is returned to its ON position, the suspended state of the computer is cancelled and the OS resumes in a short time.

In the case where a hang-up occurs in the application program or the OS, the OS-driver-based application program fails to respond to the suspending-request message from the BIOS and does not return the information to the BIOS which indicates that the suspending process is permitted. In this case, when the elapsed time indicated by the software timer in the BIOS reaches the predetermined time interval T1, the BIOS transmits the turn-OFF command to the power-supply management portion 4. The power-supply management portion 4 controls the power-supply controller in response to the turn-OFF command, and thereby changes the computer to its OFF state. Accordingly, in this case, the power supply to the computer is forced to be cut off. In the event that a hang-up occurs also in the BIOS, when the elapsed time indicated by the hardware timer in the power-supply management portion 4 reaches the predetermined time interval T3, the power-supply management portion 4 controls the power-supply controller 5 and thereby changes the computer to its OFF state. Therefore, also in this case, the power supply to the computer is forced to be cut off.

Thus, in the case where the occurrence of a hang-up in the OS, the application program, or the BIOS hinders the computer from falling into its suspended state when the ACC switch is changed to its OFF position, the power supply to the computer is forced to be cut off. Accordingly, it is possible to prevent the vehicular battery from being excessively discharged.

Figure 3:
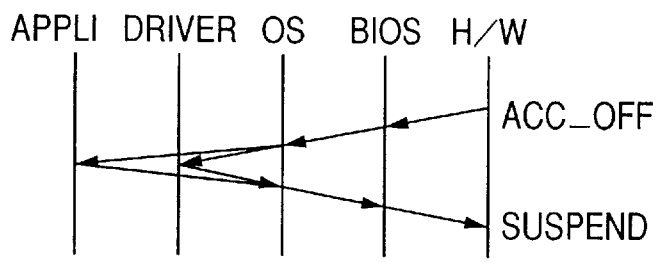
FIG. 3 is a diagram of a first exemplary sequence of communications among hardware devices, a BIOS, an OS, a driver program, and an application program in the on-vehicle computer in FIG. 1.

With reference to FIG. 3, in the case where the computer operates normally, when the ACC switch 8 is changed to its OFF state, the power-supply management program informs the BIOS of the ACC_OFF state and the BIOS transmits the suspending-request message to the OS-driver-based application program. Then, the OS-driver-based application program returns the information to the BIOS which indicates that the suspending process is permitted. The BIOS transmits the suspending command to the power-supply management portion 4 in response to the return information from the OS-driver-based application program. The power-supply management portion 4 controls the power-supply controller 5 in response to the suspending command, and thereby changes the computer to its suspended state.

Figure 4:
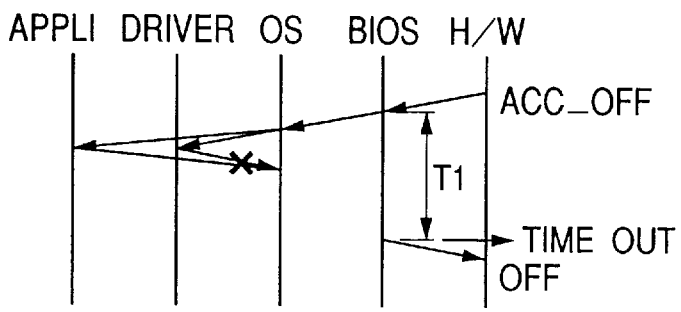
FIG. 4 is a diagram of a second exemplary sequence of communications among the hardware devices, the BIOS, the OS, the driver program, and the application program in the on-vehicle computer in FIG. 1.

With reference to FIG. 4, when the ACC switch 8 is changed to its OFF state, the power-supply management program informs the BIOS of the ACC_OFF state and the BIOS transmits the suspending-request message to the OS-driver-based application program. It is assumed that a hang-up occurs in the application program or the driver, and hence the OS-driver-based application program does not return the information to the BIOS which indicates that the suspending process is permitted. In this case, when the elapsed time indicated by the software timer in the BIOS reaches the predetermined time interval T1, the BIOS transmits the turn-OFF command to the power-supply management portion 4. The power-supply management portion 4 controls the power-supply controller 5 in response to the turn-OFF command, and thereby changes the computer to its OFF state.

Figure 5:
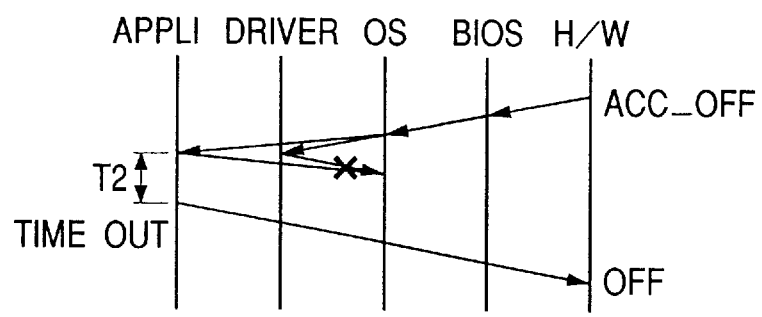
FIG. 5 is a diagram of a third exemplary sequence of communications among the hardware devices, the BIOS, the OS, the driver program, and the application program in the on-vehicle computer in FIG. 1.

With reference to FIG. 5, when the ACC switch 8 is changed to its OFF state, the power-supply management program informs the BIOS of the ACC_OFF state and the BIOS transmits the suspending-request message to the OS-driver-based application program. Then, the OS-driver-based application program returns the information to the BIOS which indicates that the suspending process is permitted. It is assumed that a hang-up occurs in the BIOS, and hence the BIOS does not transmit the suspending command to the power-supply management portion 4 in response to the return information from the OS-driver-based application program. In this case, when the elapsed time indicated by the software timer in the application program reaches the predetermined time interval T2, the application program transmits the turn-OFF command to the power-supply management portion 4. The power-supply management portion 4 controls the power-supply controller 5 in response to the turn-OFF command, and thereby changes the computer to its OFF state.

Figure 6:
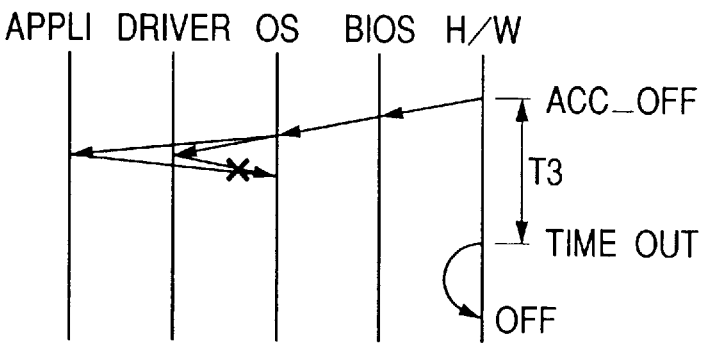
FIG. 6 is a diagram of a fourth exemplary sequence of communications among the hardware devices, the BIOS, the OS, the driver program, and the application program in the on-vehicle computer in FIG. 1.

With reference to FIG. 6, when the ACC switch 8 is changed to its OFF state, the power-supply management program informs the BIOS of the ACC_OFF state and the BIOS transmits the suspending-request message to the OS-driver-based application program. It is assumed that hang-ups occur in both the OS-driver-based application program and the BIOS, and hence the OS-driver-based application program and the BIOS do not transmit the suspending command and the turn-OFF commands to the power-supply management portion 4. In this case, when the elapsed time indicated by the hardware timer in the power-supply management portion 4 reaches the predetermined time interval T3, the power-supply management portion 4 controls the power-supply controller and thereby changes the computer to its OFF state.

Second Embodiment

Figure 7:
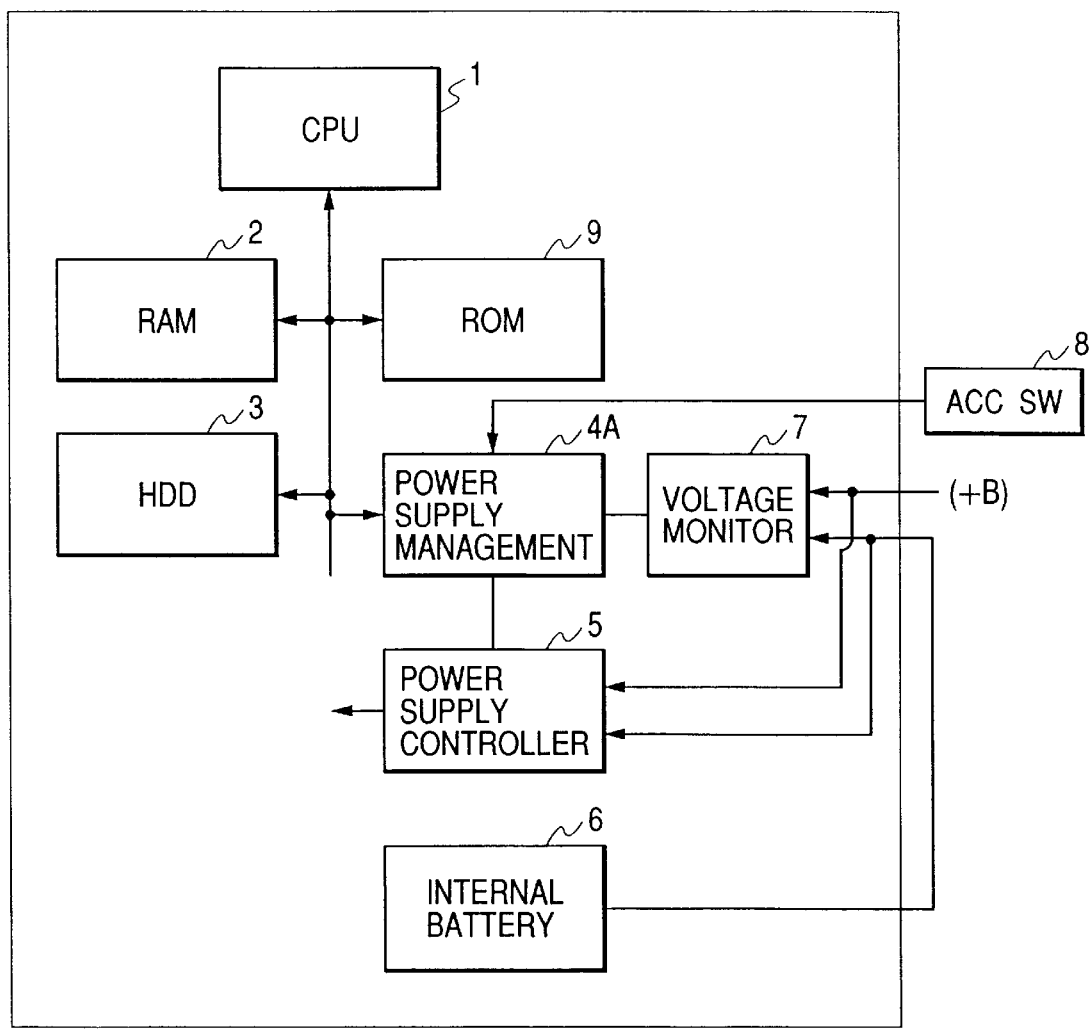
FIG. 7 is a block diagram of an on-vehicle computer according to a second embodiment of this invention.

FIG. 7 shows a block diagram of an on-vehicle computer according to a second embodiment of this invention. The on-vehicle computer of FIG. 7 is similar to the on-vehicle computer of FIG. 1 except for design changes indicated hereinafter.

The on-vehicle computer of FIG. 7 includes a power-supply management portion 4A instead of the power-supply management portion 4 (see FIG. 1). The power-supply management portion 4A has a power-state register for storing a signal representing that a power voltage is in a predetermined low range.

The on-vehicle computer of FIG. 7 is changed among an OFF state, a normal ON state (a normal operation state), and a shut-down state in accordance with operation of the power-supply controller 5.

Figure 8:
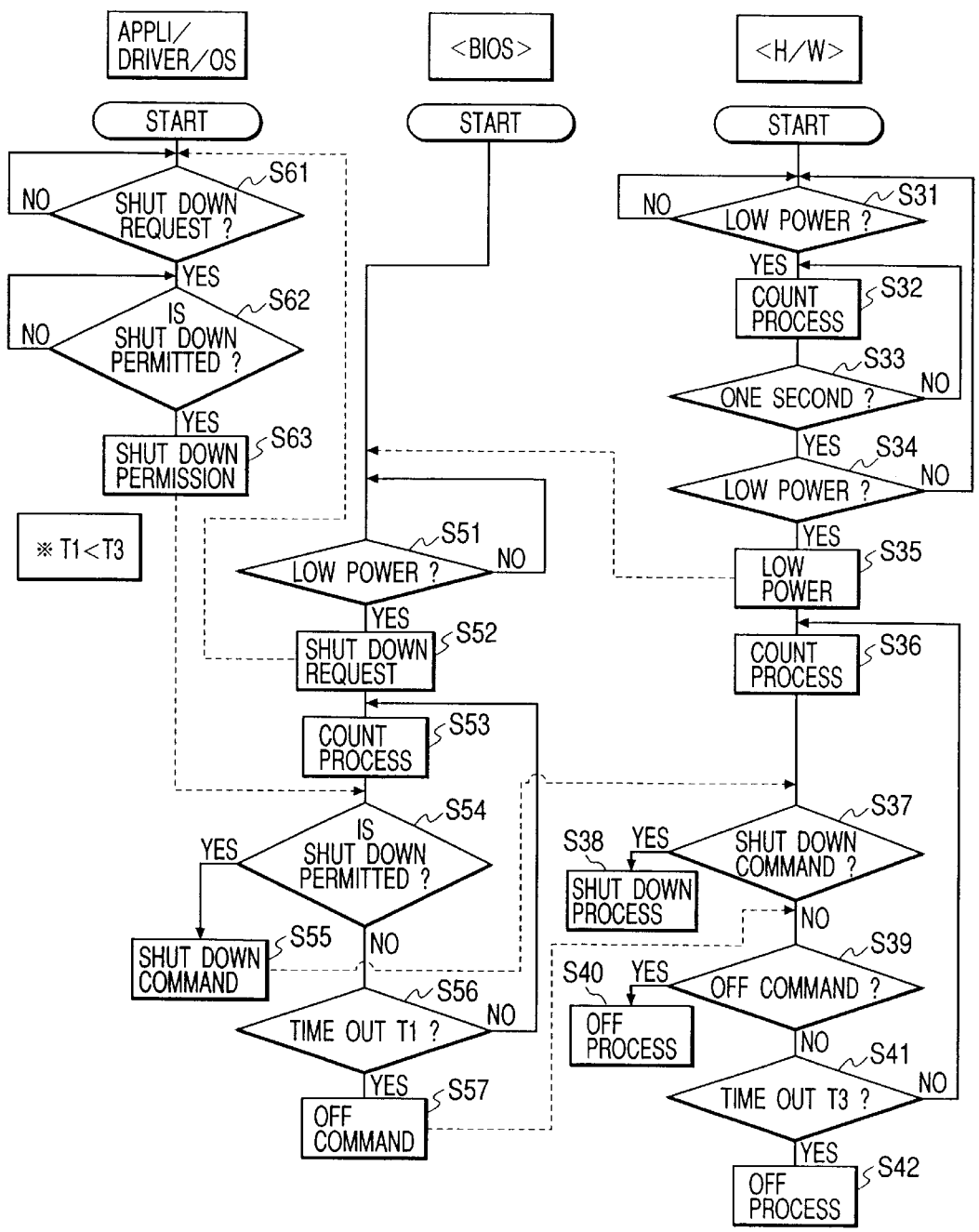
FIG. 8 is a set of flowcharts of program segments in the on-vehicle computer in FIG. 7.

An explanation will be given of a change of the on-vehicle computer from its ON state to its shut-down state. The right-hand portion <H/W> of FIG. 8 is a flowchart of a segment of a power-supply management program for controlling the power-supply management portion 4A. As shown in FIG. 8, a first step S31 of the power-supply management program segment derives a current voltage at the "+B" line and a current voltage of the internal battery 6 from the information generated by the voltage monitoring portion 7. The step S31 compares the current "+B" line voltage with a first predetermined reference voltage. The step S31 compares the current internal-battery voltage with a second predetermined reference voltage. When the current "+B" line voltage is lower than the first predetermined reference voltage or when the current internal-battery voltage is lower than the second predetermined reference voltage, the program advances from the step S31 to a step S32. When the current "+B" line voltage is equal to or higher than the first predetermined reference voltage and also the current internal-battery voltage is equal to or higher than the second predetermined reference voltage, the step S31 is repeated. Generally, the first and second predetermined reference voltages are different from each other. The first and second predetermined reference voltages may be equal to each other.

The step S32 implements a counting process. Specifically, the step S32 starts a software timer (a timer provided by the power-supply management program), or increments the elapsed time (the time-representing number) indicated by the software timer.

A step S33 following the step S32 compares the elapsed time indicated by the software timer with a time interval of one second. When the elapsed time indicated by the software timer reaches a time interval of one second, the program advances from the step S33 to a step S34. Otherwise, the program returns from the step S33 to the step S32.

The step S34 derives a current voltage at the "+B" line and a current voltage of the internal battery 6 from the information generated by the voltage monitoring portion 7. The step S34 compares the current "+B" line voltage with the first predetermined reference voltage. The step S34 compares the current internal-battery voltage with the second predetermined reference voltage. When the current "+B" line voltage is lower than the first predetermined reference voltage or when the current internal-battery voltage is lower than the second predetermined reference voltage, the program advances from the step S34 to a step S35. When the current "+B" line voltage is equal to or higher than the first predetermined reference voltage and also the current internal-battery voltage is equal to or higher than the second predetermined reference voltage, the program returns from the step S34 to the step S31.

The step S35 loads the power-state register with a signal representing a low power-voltage state. After the step S35, the program advances to a step S36.

The step S36 implements a counting process. Specifically, the step S36 starts the hardware timer in the power-supply management portion 4A, or increments the elapsed time (the time-representing number) indicated by the hardware timer.

A step S37 following the step S36 decides whether or not a shutting-down command is present. The shutting-down command is given by a BIOS. When the shutting-down command is present, the program advances from the step S37 to a step S38. When the shutting-down command is not present, the program advances from the step S37 to a step S39.

The step S38 controls the power-supply controller 5, and thereby changes the computer to its shut-down state. After the step S38, the current execution cycle of the power-supply management program segment ends.

The step S39 decides whether or not a turn-OFF command is present. The turn-OFF command is given by the BIOS. When the turn-OFF command is present, the program advances from the step S39 to a step S40. When the turn-OFF command is not present, the program advances from the step S39 to a step S41.

The step S40 controls the power-supply controller 5, and thereby changes the computer to its OFF state. Then, the step S40 resets or stops the hardware timer. After the step S40, the current execution cycle of the power-supply management program segment ends.

The step S41 compares the elapsed time indicated by the hardware timer with a predetermined time interval T3. When the elapsed time indicated by the hardware timer reaches the predetermined time interval T3, the program advances from the step S41 to a step S42. Otherwise, the program returns from the step S41 to the step S36.

The step S42 controls the power-supply controller 5, and thereby changes the computer to its OFF state. After the step S42, the current execution cycle of the power-supply management program segment ends.

The intermediate portion <BIOS> of FIG. 8 is a flowchart of a segment of the BIOS for controlling the CPU 1. As shown in FIG. 8, a first step S51 of the BIOS segment accesses the power-state register in the power-supply management portion 4A, and decides whether or not the signal in the power-state register represents the low power-voltage state. When the signal in the power-state register represents the low power-voltage state, the program advances from the step S51 to a step S52. When the signal in the power-state register does not represent the low power-voltage state, the step S51 is repeated.

The step S52 transmits a shutting-down-request message to an application program. After the step S52, the program advances to a step S53.

The step S53 implements a counting process. Specifically, the step S53 starts a software timer (a BIOS timer or a timer provided by the BIOS), or increments the elapsed time (the time-representing number) indicated by the software timer.

A step S54 following the step S53 decides whether or not a shutting-down process is permitted. Information of whether or not the shutting-down process is permitted is given by the application program. When the shutting-down process is permitted, the program advances from the step S54 to a step S55. When the shutting-down process is not permitted, the program advances from the step S54 to a step S56.

The step S55 generates a shutting-down command. The step S55 transmits the shutting-down command to the power-supply management portion 4A. Then, the step S55 resets or stops the software timer. After the step S55, the current execution cycle of the BIOS segment ends.

The step S56 compares the elapsed time indicated by the software timer with a predetermined time interval T1. Preferably, the predetermined time interval T1 is shorter than the predetermined time interval T3. When the elapsed time indicated by the software timer reaches the predetermined time interval T1, the program advances from the step S56 to a step S57. Otherwise, the program returns from the step S56 to the step S53.

The step S57 generates a turn-OFF command. The step S57 transmits the turn-OFF command to the power-supply management portion 4A. After the step S57, the current execution cycle of the BIOS segment ends.

The left-hand portion <APPLI/DRIVER/OS> of FIG. 8 is a flowchart of a segment of the OS-driver-based application program for controlling the CPU 1. The application program segment in FIG. 8 is periodically executed by, for example, an interruption process. As shown in FIG. 8, a first step S61 of the application program segment decides whether or not a shutting-down-request message is present. The shutting-down-request message is transmitted from the BIOS. When the shutting-down-request message is present, the program advances from the step S61 to a step S62. When the shutting-down-request message is not present, the step S61 is repeated.

The step S62 decides whether or not a shutting-down process is permitted. When the shutting-down process is permitted, the program advances from the step S62 to a step S63. When the shutting-down process is not permitted, the step S62 is repeated.

The step S63 informs the BIOS that the shutting-down process is permitted. After the step S63, the current execution cycle of the application program segment ends and then the program returns to a main routine.

During the period of time between the moment of start of the hardware timer and the moment at which the elapsed time indicated by the hardware timer reaches the predetermined time interval T3, when the power-supply management portion 4A receives a shutting-down command from the BIOS, the power-supply management portion 4A controls the power-supply controller 5 and thereby changes the computer to its shut-down state.

During the period of time between the moment of start of the hardware timer and the moment at which the elapsed time indicated by the hardware timer reaches the predetermined time interval T3, when the power-supply management portion 4A receives a turn-OFF command from the BIOS, the power-supply management portion 4A controls the power-supply controller 5 and thereby changes the computer to its OFF state. In addition, the power-supply management portion 4A resets or stops the hardware timer.

In the case where the power-supply management portion 4A continues to receive neither a shutting-down command nor a turn-OFF command and then the elapsed time indicated by the hardware timer reaches the predetermined time interval T3, the power-supply management portion 4A controls the power-supply controller 5 and thereby changes the computer to its OFF state.

It is preferable to set the predetermined time intervals T1 and T3 as "T1<T3". According to this setting, 2-stage fail-safe can be implemented. In the case where the computer operates normally, when the power-supply management portion 4A detects that the low power-voltage state lasts for at least one second, the power-supply management program informs the BIOS of the low power-voltage state and the BIOS transmits the shutting-down-request message to the OS-driver-based application program. Then, the OS-driver-based application program returns the information to the BIOS which indicates that the shutting-down process is permitted. The BIOS transmits the shutting-down command to the power-supply management portion 4A in response to the return information from the OS-driver-based application program. The power-supply management portion 4A controls the power-supply controller 5 in response to the shutting-down command, and thereby changes the computer to its shut-down state. When the computer is in its shut-down state, the vehicular battery or the internal battery 6 is hardly discharged excessively.

In the case where a hang-up occurs in the application program or the OS, the OS-driver-based application program fails to respond to the shutting-down-request message from the BIOS and does not return the information to the BIOS which indicates that the shutting-down process is permitted. In this case, when the elapsed time indicated by the software timer in the BIOS reaches the predetermined time interval T1, the BIOS transmits the turn-OFF command to the power-supply management portion 4A. The power-supply management portion 4A controls the power-supply controller 5 in response to the turn-OFF command, and thereby changes the computer to its OFF state. Accordingly, in this case, the power supply to the computer is forced to be cut off. In the event that a hang-up occurs also in the BIOS, when the elapsed time indicated by the hardware timer in the power-supply management portion 4A reaches the predetermined time interval T3, the power-supply management portion 4A controls the power-supply controller 5 and thereby changes the computer to its OFF state. Therefore, also in this case, the power supply to the computer is forced to be cut off.

Thus, in the case where the occurrence of a hang-up in the OS, the application program, or the BIOS hinders the computer from falling into its shut-down state when the low power-voltage state continues to be detected for at least one second, the power supply to the computer is forced to be cut off. Accordingly, it is possible to prevent the vehicular battery or the internal battery 6 from being excessively discharged.

Figure 9:
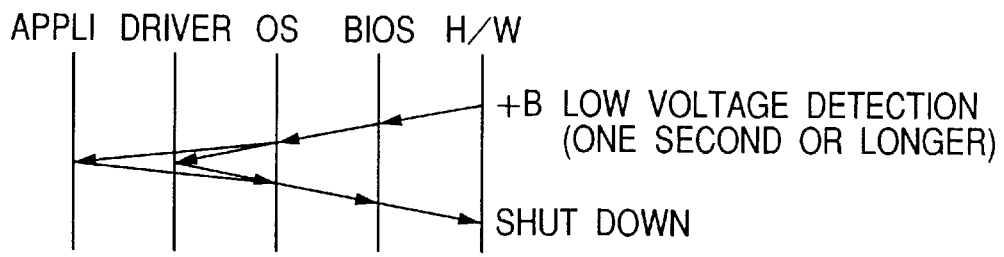
FIG. 9 is a diagram of a first exemplary sequence of communications among hardware devices, a BIOS, an OS, a driver program, and an application program in the on-vehicle computer in FIG. 7.

With reference to FIG. 9, in the case where the computer operates normally, when the power-supply management portion 4A detects that the low "+B" line voltage lasts for at least one second, the power-supply management program informs the BIOS of the low power-voltage state and the BIOS transmits the shutting-down-request message to the OS-driver-based application program. Then, the OS-driver-based application program returns the information to the BIOS which indicates that the shutting-down process is permitted. The BIOS transmits the shutting-down command to the power-supply management portion 4A in response to the return information from the OS-driver-based application program. The power-supply management portion 4A controls the power-supply controller 5 in response to the shutting-down command, and thereby changes the computer to its shut-down state.

Figure 10:
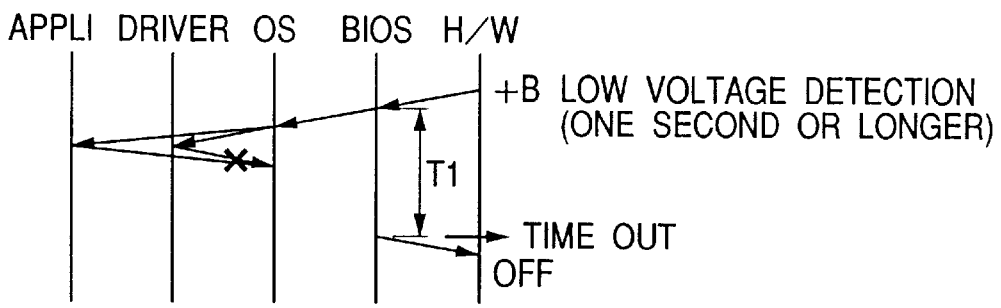
FIG. 10 is a diagram of a second exemplary sequence of communications among the hardware devices, the BIOS, the OS, the driver program, and the application program in the on-vehicle computer in FIG. 7.

With reference to FIG. 10, when the power-supply management portion 4A detects that the low "+B" line voltage lasts for at least one second, the power-supply management program informs the BIOS of the low power-voltage state and the BIOS transmits the shutting-down-request message to the OS-driver-based application program. It is assumed that a hang-up occurs in the application program or the driver, and hence the OS-driver-based application program does not return the information to the BIOS which indicates that the shutting-down process is permitted. In this case, when the elapsed time indicated by the software timer in the BIOS reaches the predetermined time interval T1, the BIOS transmits the turn-OFF command to the power-supply management portion 4A. The power-supply management portion 4A controls the power-supply controller 5 in response to the turn-OFF command, and thereby changes the computer to its OFF state.

Figure 11:
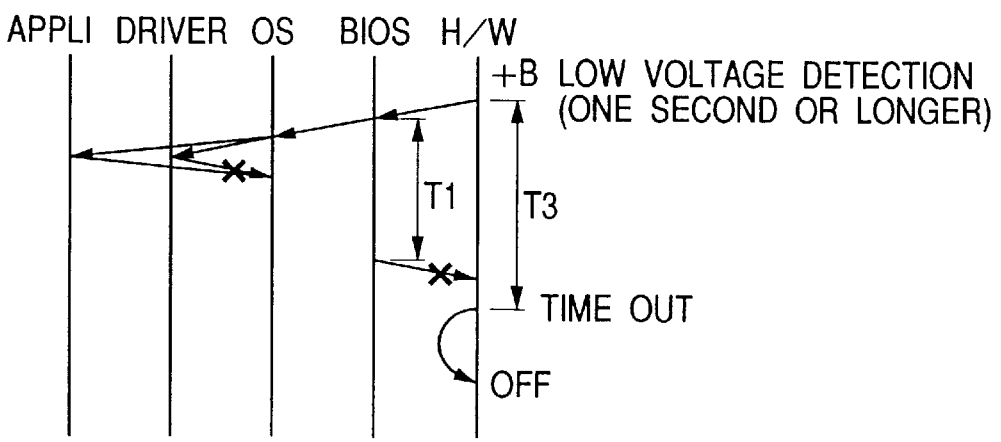
FIG. 11 is a diagram of a third exemplary sequence of communications among the hardware devices, the BIOS, the OS, the driver program, and the application program in the on-vehicle computer in FIG. 7.

With reference to FIG. 11, when the power-supply management portion 4A detects that the low "+B" line voltage lasts for at least one second, the power-supply management program informs the BIOS of the low power-voltage state and the BIOS transmits the shutting-down-request message to the OS-driver-based application program. It is assumed that a hang-up occurs in the application program or the driver, and hence the OS-driver-based application program does not return the information to the BIOS which indicates that the shutting-down process is permitted. Furthermore, it is assumed that a hang-up occurs in the BIOS. Accordingly, the BIOS does not transmit the turn-OFF command to the power-supply management portion 4A even when the elapsed time indicated by the software timer in the BIOS reaches the predetermined time interval T1. In this case, when the elapsed time indicated by the hardware timer in the power-supply management portion 4A reaches the predetermined time interval T3, the power-supply management portion 4A controls the power-supply controller 5 and thereby changes the computer to its OFF state.

Figure 12:
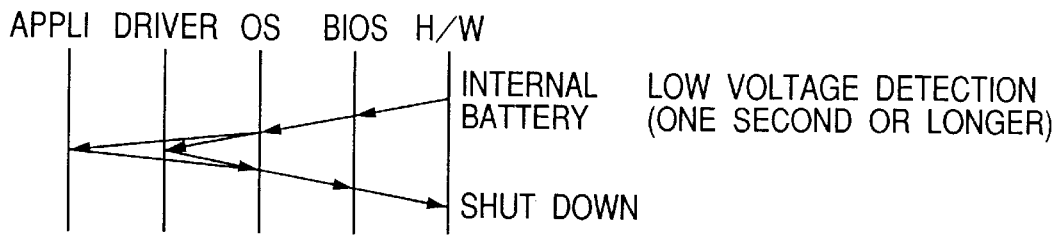
FIG. 12 is a diagram of a fourth exemplary sequence of communications among the hardware devices, the BIOS, the OS, the driver program, and the application program in the on-vehicle computer in FIG. 7.

With reference to FIG. 12, in the case where the computer operates normally, when the power-supply management portion 4A detects that the low internal-battery voltage lasts for at least one second, the power-supply management program informs the BIOS of the low power-voltage state and the BIOS transmits the shutting-down-request message to the OS-driver-based application program. Then, the OS-driver-based application program returns the information to the BIOS which indicates that the shutting-down process is permitted. The BIOS transmits the shutting-down command to the power-supply management portion 4A in response to the return information from the OS-driver-based application program. The power-supply management portion 4A controls the power-supply controller 5 in response to the shutting-down command, and thereby changes the computer to its shut-down state.

Figure 13:
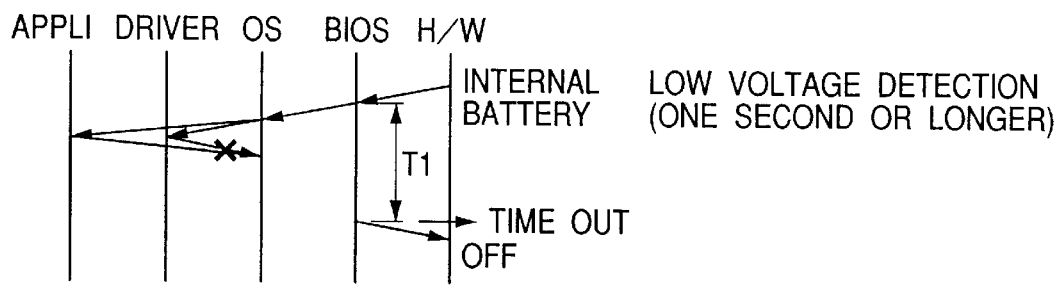
FIG. 13 is a diagram of a fifth exemplary sequence of communications among the hardware devices, the BIOS, the OS, the driver program, and the application program in the on-vehicle computer in FIG. 7.

With reference to FIG. 13, when the power-supply management portion 4A detects that the low internal-battery voltage lasts for at least one second, the power-supply management program informs the BIOS of the low power-voltage state and the BIOS transmits the shutting-down-request message to the OS-driver-based application program. It is assumed that a hang-up occurs in the application program or the driver, and hence the OS-driver-based application program does not return the information to the BIOS which indicates that the shutting-down process is permitted. In this case, when the elapsed time indicated by the software timer in the BIOS reaches the predetermined time interval T1, the BIOS transmits the turn-OFF command to the power-supply management portion 4A. The power-supply management portion 4A controls the power-supply controller 5 in response to the turn-OFF command, and thereby changes the computer to its OFF state.

Figure 14:
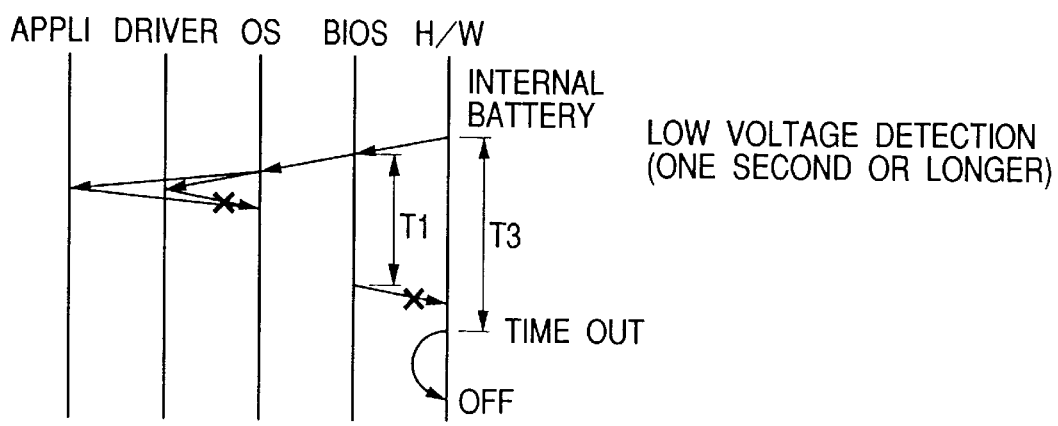
FIG. 14 is a diagram of a sixth exemplary sequence of communications among the hardware devices, the BIOS, the OS, the driver program, and the application program in the on-vehicle computer in FIG. 7.

With reference to FIG. 14, when the power-supply management portion 4A detects that the low internal-battery voltage lasts for at least one second, the power-supply management program informs the BIOS of the low power-voltage state and the BIOS transmits the shutting-down-request message to the OS-driver-based application program. It is assumed that a hang-up occurs in the application program or the driver, and hence the OS-driver-based application program does not return the information to the BIOS which indicates that the shutting-down process is permitted. Furthermore, it is assumed that a hang-up occurs in the BIOS. Accordingly, the BIOS does not transmit the turn-OFF command to the power-supply management portion 4A even when the elapsed time indicated by the software timer in the BIOS reaches the predetermined time interval T1. In this case, when the elapsed time indicated by the hardware timer in the power-supply management portion 4A reaches the predetermined time interval T3, the power-supply management portion 4A controls the power-supply controller 5 and thereby changes the computer to its OFF state.

Third Embodiment

Figure 15:
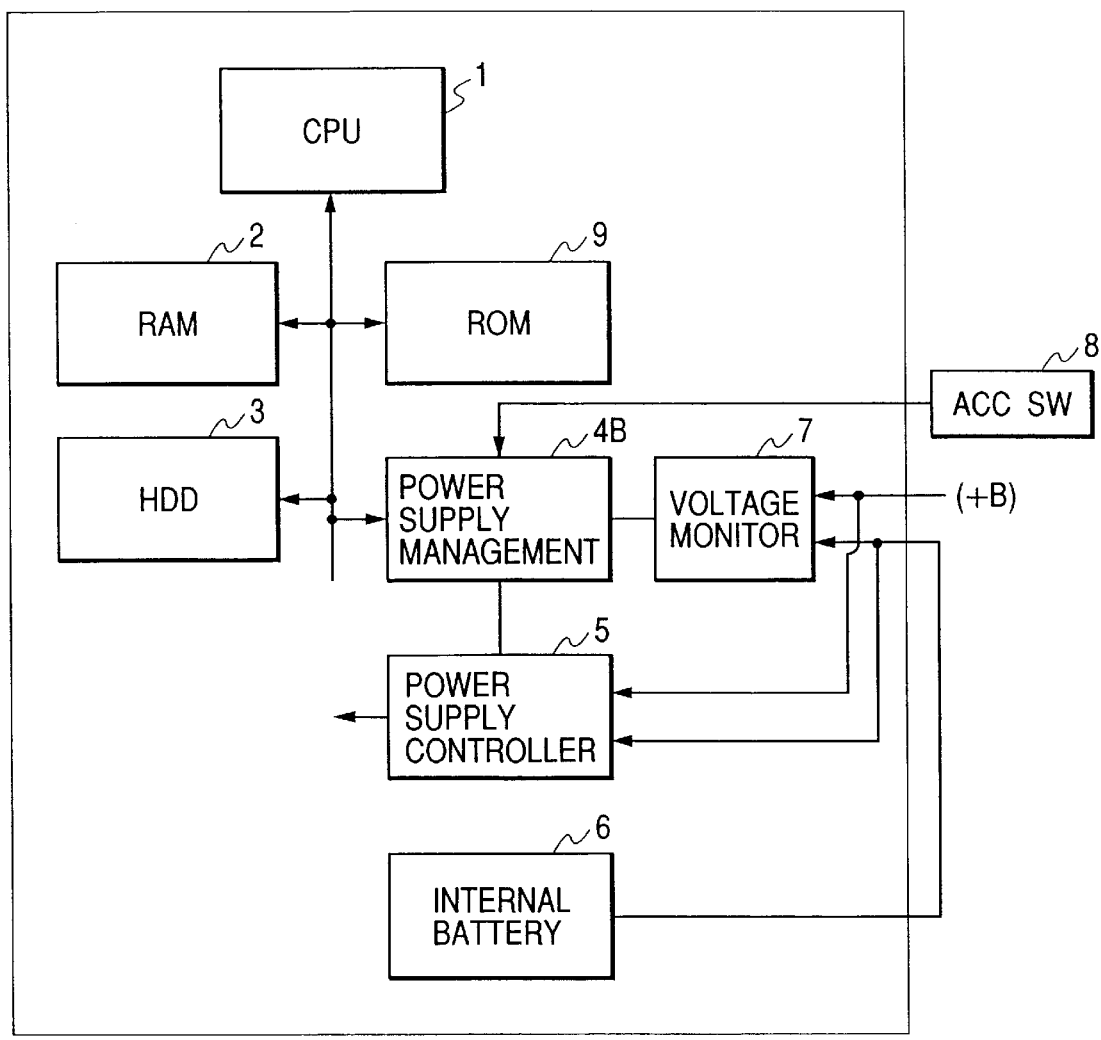
FIG. 15 is a block diagram of an on-vehicle computer according to a third embodiment of this invention.

FIG. 15 shows a block diagram of an on-vehicle computer according to a third embodiment of this invention. The on-vehicle computer of FIG. 15 is similar to the on-vehicle computer of FIG. 7 except for design changes indicated hereinafter.

The on-vehicle computer of FIG. 15 includes a power-supply management portion 4B instead of the power-supply management portion 4A (see FIG. 7). The power-supply management portion 4B has a function of deciding whether or not the computer is in a suspended state.

The on-vehicle computer of FIG. 15 is changed among an OFF state, a normal ON state (a normal operation state), a shut-down state, and a suspended state in accordance with operation of the power-supply controller 5.

Figure 16:
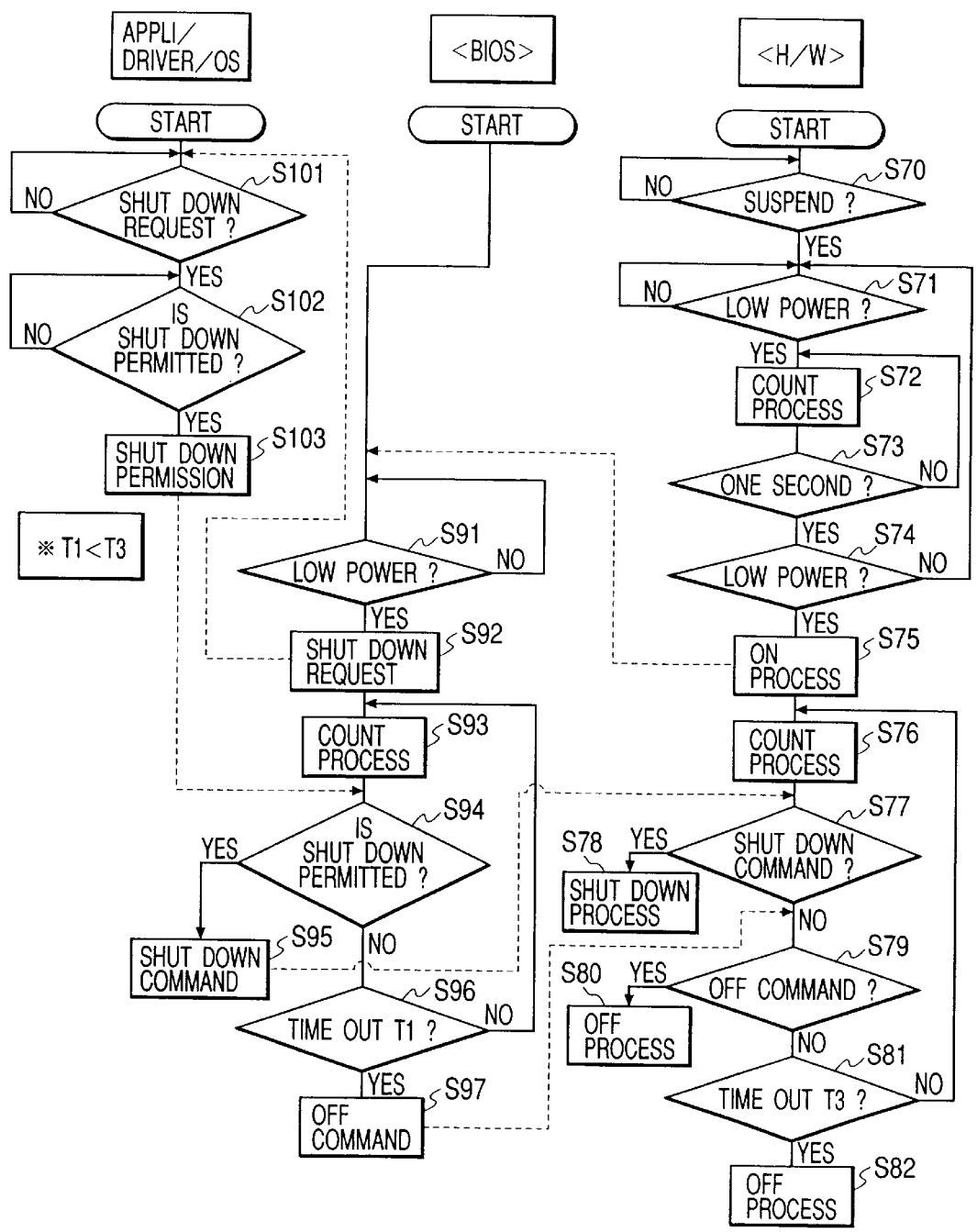
FIG. 16 is a set of flowcharts of program segments in the on-vehicle computer in FIG. 15.

An explanation will be given of a change of the on-vehicle computer from its suspended state to its shut-down state. The right-hand portion <H/W> of FIG. 16 is a flowchart of a segment of a power-supply management program for controlling the power-supply management portion 4B. As shown in FIG. 16, a first step S70 of the power-supply management program segment decides whether or not the computer is in its suspended state. When the computer is in its suspended state, the program advances from the step S70 to a step S71. When the computer is not in its suspended state, the step S70 is repeated.

The step S71 derives a current voltage at the "+B" line and a current voltage of the internal battery 6 from the information generated by the voltage monitoring portion 7. The step S71 compares the current "+B" line voltage with a first predetermined reference voltage. The step S71 compares the current internal-battery voltage with a second predetermined reference voltage. When the current "+B" line voltage is lower than the first predetermined reference voltage or when the current internal-battery voltage is lower than the second predetermined reference voltage, the program advances from the step S71 to a step S72. When the current "+B" line voltage is equal to or higher than the first predetermined reference voltage and also the current internal-battery voltage is equal to or higher than the second predetermined reference voltage, the step S71 is repeated. Generally, the first and second predetermined reference voltages are different from each other. The first and second predetermined reference voltages may be equal to each other.

The step S72 implements a counting process. Specifically, the step S72 starts a software timer (a timer provided by the power-supply management program), or increments the elapsed time (the time-representing number) indicated by the software timer.

A step S73 following the step S72 compares the elapsed time indicated by the software timer with a time interval of one second. When the elapsed time indicated by the software timer reaches a time interval of one second, the program advances from the step S73 to a step S74. Otherwise, the program returns from the step S73 to the step S72.

The step S74 derives a current voltage at the "+B" line and a current voltage of the internal battery 6 from the information generated by the voltage monitoring portion 7. The step S74 compares the current "+B" line voltage with the first predetermined reference voltage. The step S74 compares the current internal-battery voltage with the second predetermined reference voltage. When the current "+B" line voltage is lower than the first predetermined reference voltage or when the current internal-battery voltage is lower than the second predetermined reference voltage, the program advances from the step S74 to a step S75. When the current "+B" line voltage is equal to or higher than the first predetermined reference voltage and also the current internal-battery voltage is equal to or higher than the second predetermined reference voltage, the program returns from the step S74 to the step S71.

The step S75 loads the power-state register with a signal representing a low power-voltage state. The step S75 controls the power-supply controller 5, and thereby changes the computer to its ON state. After the step S75, the program advances to a step S76.

The step S76 implements a counting process. Specifically, the step S76 starts the hardware timer in the power-supply management portion 4B, or increments the elapsed time (the time-representing number) indicated by the hardware timer.

A step S77 following the step S76 decides whether or not a shutting-down command is present. The shutting-down command is given by a BIOS. When the shutting-down command is present, the program advances from the step S77 to a step S78. When the shutting-down command is not present, the program advances from the step S77 to a step S79.

The step S78 controls the power-supply controller 5, and thereby changes the computer to its shut-down state. After the step S78, the current execution cycle of the power-supply management program segment ends.

The step S79 decides whether or not a turn-OFF command is present. The turn-OFF command is given by the BIOS. When the turn-OFF command is present, the program advances from the step S79 to a step S80. When the turn-OFF command is not present, the program advances from the step S79 to a step S81.

The step S80 controls the power-supply controller 5, and thereby changes the computer to its OFF state. Then, the step S80 resets or stops the hardware timer. After the step S80, the current execution cycle of the power-supply management program segment ends.

The step S81 compares the elapsed time indicated by the hardware timer with a predetermined time interval T3. When the elapsed time indicated by the hardware timer reaches the predetermined time interval T3, the program advances from the step S81 to a step S82. Otherwise, the program returns from the step S81 to the step S76.

The step S82 controls the power-supply controller 5, and thereby changes the computer to its OFF state. After the step S82, the current execution cycle of the power-supply management program segment ends.

The intermediate portion <BIOS> of FIG. 16 is a flowchart of a segment of the BIOS for controlling the CPU 1. As shown in FIG. 16, a first step S91 of the BIOS segment accesses the power-state register in the power-supply management portion 4B, and decides whether or not the signal in the power-state register represents the low power-voltage state. When the signal in the power-state register represents the low power-voltage state, the program advances from the step S91 to a step S92. When the signal in the power-state register does not represent the low power-voltage state, the step S91 is repeated.

The step S92 transmits a shutting-down-request message to an application program. After the step S92, the program advances to a step S93.

The step S93 implements a counting process. Specifically, the step S93 starts a software timer (a BIOS timer or a timer provided by the BIOS), or increments the elapsed time (the time-representing number) indicated by the software timer.

A step S94 following the step S93 decides whether or not a shutting-down process is permitted. Information of whether or not the shutting-down process is permitted is given by the application program. When the shutting-down process is permitted, the program advances from the step S94 to a step S95. When the shutting-down process is not permitted, the program advances from the step S94 to a step S96.

The step S95 generates a shutting-down command. The step S95 transmits the shutting-down command to the power-supply management portion 4B. Then, the step S95 resets or stops the software timer. After the step S95, the current execution cycle of the BIOS segment ends.

The step S96 compares the elapsed time indicated by the software timer with a predetermined time interval T1. Preferably, the predetermined time interval T1 is shorter than the predetermined time interval T3. When the elapsed time indicated by the software timer reaches the predetermined time interval T1, the program advances from the step S96 to a step S97. Otherwise, the program returns from the step S96 to the step S93.

The step S97 generates a turn-OFF command. The step S97 transmits the turn-OFF command to the power-supply management portion 4B. After the step S97, the current execution cycle of the BIOS segment ends.

The left-hand portion <APPLI/DRIVER/OS> of FIG. 16 is a flowchart of a segment of the OS-driver-based application program for controlling the CPU 1. The application program segment in FIG. 16 is periodically executed by, for example, an interruption process. As shown in FIG. 16, a first step S101 of the application program segment decides whether or not a shutting-down-request message is present. The shutting-down-request message is transmitted from the BIOS. When the shutting-down-request message is present, the program advances from the step S101 to a step S102. When the shutting-down-request message is not present, the step S101 is repeated.

The step S102 decides whether or not a shutting-down process is permitted. When the shutting-down process is permitted, the program advances from the step S102 to a step S103. When the shutting-down process is not permitted, the step S102 is repeated.

The step S103 informs the BIOS that the shutting-down process is permitted. After the step S103, the current execution cycle of the application program segment ends and then the program returns to a main routine.

During the period of time between the moment of start of the hardware timer and the moment at which the elapsed time indicated by the hardware timer reaches the predetermined time interval T3, when the power-supply management portion 4B receives a shutting-down command from the BIOS, the power-supply management portion 4B controls the power-supply controller 5 and thereby changes the computer to its shut-down state.

During the period of time between the moment of start of the hardware timer and the moment at which the elapsed time indicated by the hardware timer reaches the predetermined time interval T3, when the power-supply management portion 4B receives a turn-OFF command from the BIOS, the power-supply management portion 4B controls the power-supply controller 5 and thereby changes the computer to its OFF state. In addition, the power-supply management portion 4B resets or stops the hardware timer.

In the case where the power-supply management portion 4B continues to receive neither a shutting-down command nor a turn-OFF command and then the elapsed time indicated by the hardware timer reaches the predetermined time interval T3, the power-supply management portion 4B controls the power-supply controller 5 and thereby changes the computer to its OFF state.

It is preferable to set the predetermined time intervals T1 and T3 as "T1<T3". According to this setting, 2-stage fail-safe can be implemented. In the case where the computer operates normally in its suspended state, when the power-supply management portion 4B detects that the low power-voltage state lasts for at least one second, the power-supply management program controls the power-supply controller 5 and thereby changes the computer to its ON state. In addition, the power-supply management program informs the BIOS of the low power-voltage state and the BIOS transmits the shutting-down-request message to the OS-driver-based application program. Then, the OS-driver-based application program returns the information to the BIOS which indicates that the shutting-down process is permitted. The BIOS transmits the shutting-down command to the power-supply management portion 4B in response to the return information from the OS-driver-based application program. The power-supply management portion 4B controls the power-supply controller 5 in response to the shutting-down command, and thereby changes the computer to its shut-down state. When the computer is in its shut-down state, the vehicular battery or the internal battery 6 is hardly discharged excessively.

In the case where a hang-up occurs in the application program or the OS, the OS-driver-based application program fails to respond to the shutting-down-request message from the BIOS and does not return the information to the BIOS which indicates that the shutting-down process is permitted. In this case, when the elapsed time indicated by the software timer in the BIOS reaches the predetermined time interval T1, the BIOS transmits the turn-OFF command to the power-supply management portion 4B. The power-supply management portion 4B controls the power-supply controller 5 in response to the turn-OFF command, and thereby changes the computer to its OFF state. Accordingly, in this case, the power supply to the computer is forced to be cut off. In the event that a hang-up occurs also in the BIOS, when the elapsed time indicated by the hardware timer in the power-supply management portion 4B reaches the predetermined time interval T3, the power-supply management portion 4B controls the power-supply controller 5 and thereby changes the computer to its OFF state. Therefore, also in this case, the power supply to the computer is forced to be cut off.

Thus, in the case where the occurrence of a hang-up in the OS, the application program, or the BIOS hinders the computer from falling into its shut-down state when the low power-voltage state continues to be detected for at least one second, the power supply to the computer is forced to be cut off. Accordingly, it is possible to prevent the vehicular battery or the internal battery 6 from being excessively discharged.

Figure 17:
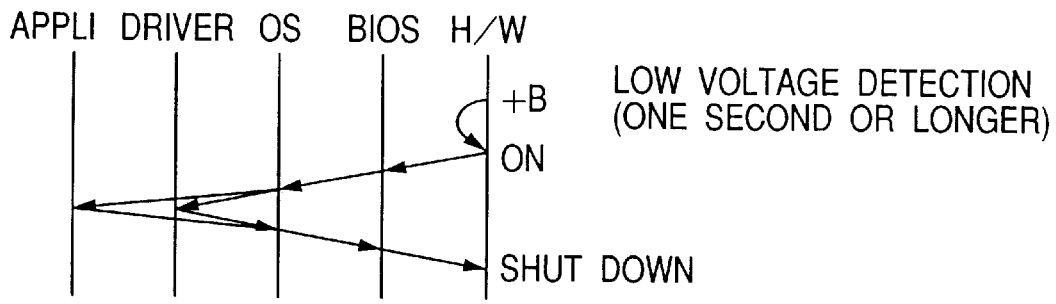
FIG. 17 is a diagram of a first exemplary sequence of communications among hardware devices, a BIOS, an OS, a driver program, and an application program in the on-vehicle computer in FIG. 15.

With reference to FIG. 17, in the case where the computer operates normally in its suspended state, when the power-supply management portion 4B detects that the low "+B" line voltage lasts for at least one second, the power-supply management program controls the power-supply controller 5 and thereby changes the computer to its ON state. In addition, the power-supply management program informs the BIOS of the low power-voltage state and the BIOS transmits the shutting-down-request message to the OS-driver-based application program. Then, the OS-driver-based application program returns the information to the BIOS which indicates that the shutting-down process is permitted. The BIOS transmits the shutting-down command to the power-supply management portion 4B in response to the return information from the OS-driver-based application program. The power-supply management portion 4B controls the power-supply controller 5 in response to the shutting-down command, and thereby changes the computer to its shut-down state.

Figure 18:
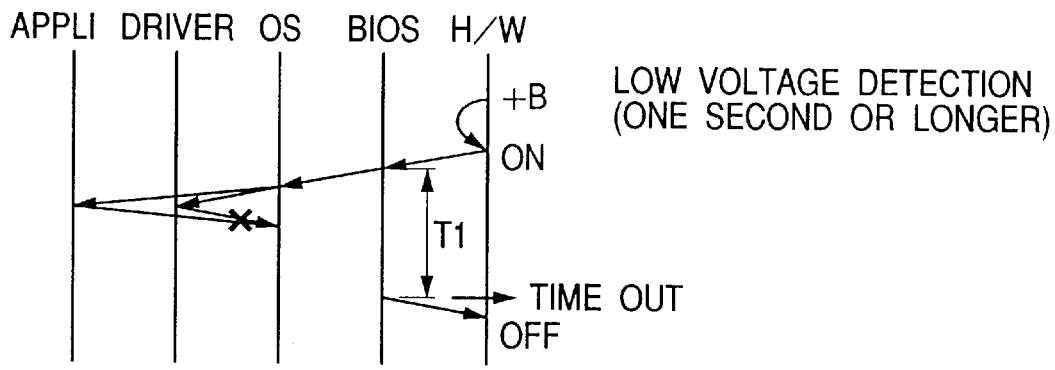
FIG. 18 is a diagram of a second exemplary sequence of communications among the hardware devices, the BIOS, the OS, the driver program, and the application program in the on-vehicle computer in FIG. 15.

With reference to FIG. 18, when the power-supply management portion 4B detects that the low "+B" line voltage lasts for at least one second, the power-supply management program controls the power-supply controller 5 and thereby changes the computer to its ON state. In addition, the power-supply management program informs the BIOS of the low power-voltage state and the BIOS transmits the shutting-down-request message to the OS-driver-based application program. It is assumed that a hang-up occurs in the application program or the driver, and hence the OS-driver-based application program does not return the information to the BIOS which indicates that the shutting-down process is permitted. In this case, when the elapsed time indicated by the software timer in the BIOS reaches the predetermined time interval T1, the BIOS transmits the turn-OFF command to the power-supply management portion 4B. The power-supply management portion 4B controls the power-supply controller 5 in response to the turn-OFF command, and thereby changes the computer to its OFF state.

Figure 19:
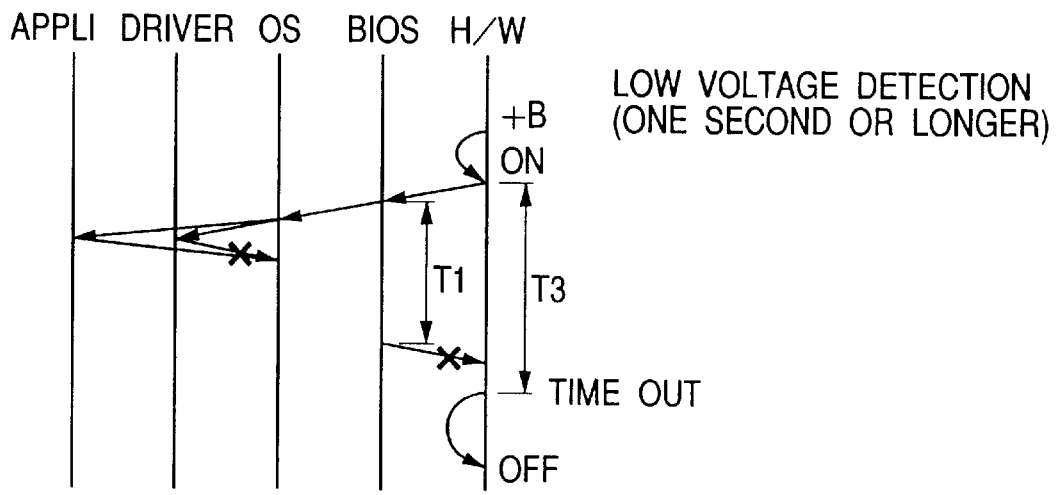
FIG. 19 is a diagram of a third exemplary sequence of communications among the hardware devices, the BIOS, the OS, the driver program, and the application program in the on-vehicle computer in FIG. 15.

With reference to FIG. 19, when the power-supply management portion 4B detects that the low "+B" line voltage lasts for at least one second, the power-supply management program controls the power-supply controller 5 and thereby changes the computer to its ON state. In addition, the power-supply management program informs the BIOS of the low power-voltage state and the BIOS transmits the shutting-down-request message to the OS-driver-based application program. It is assumed that a hang-up occurs in the application program or the driver, and hence the OS-driver-based application program does not return the information to the BIOS which indicates that the shutting-down process is permitted. Furthermore, it is assumed that a hang-up occurs in the BIOS. Accordingly, the BIOS does not transmit the turn-OFF command to the power-supply management portion 4B even when the elapsed time indicated by the software timer in the BIOS reaches the predetermined time interval T1. In this case, when the elapsed time indicated by the hardware timer in the power-supply management portion 4B reaches the predetermined time interval T3, the power-supply management portion 4B controls the power-supply controller 5 and thereby changes the computer to its OFF state.

Figure 20:
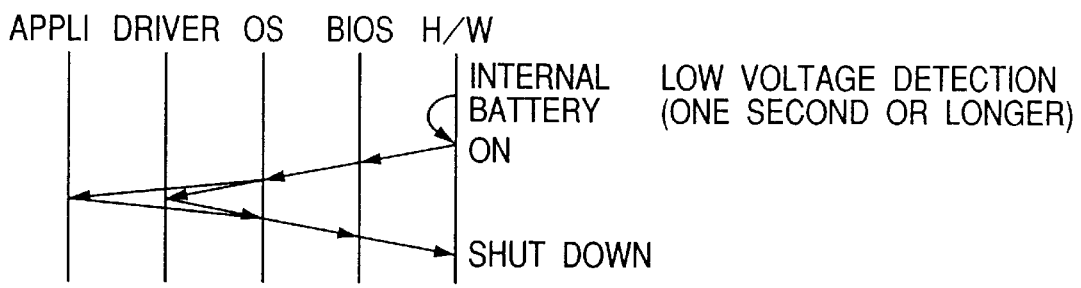
FIG. 20 is a diagram of a fourth exemplary sequence of communications among the hardware devices, the BIOS, the OS, the driver program, and the application program in the on-vehicle computer in FIG. 15.

With reference to FIG. 20, in the case where the computer operates normally, when the power-supply management portion 4B detects that the low internal-battery voltage lasts for at least one second, the power-supply management program controls the power-supply controller 5 and thereby changes the computer to its ON state. In addition, the power-supply management program informs the BIOS of the low power-voltage state and the BIOS transmits the shutting-down-request message to the OS-driver-based application program. Then, the OS-driver-based application program returns the information to the BIOS which indicates that the shutting-down process is permitted. The BIOS transmits the shutting-down command to the power-supply management portion 4B in response to the return information from the OS-driver-based application program. The power-supply management portion 4B controls the power-supply controller 5 in response to the shutting-down command, and thereby changes the computer to its shut-down state.

Figure 21:
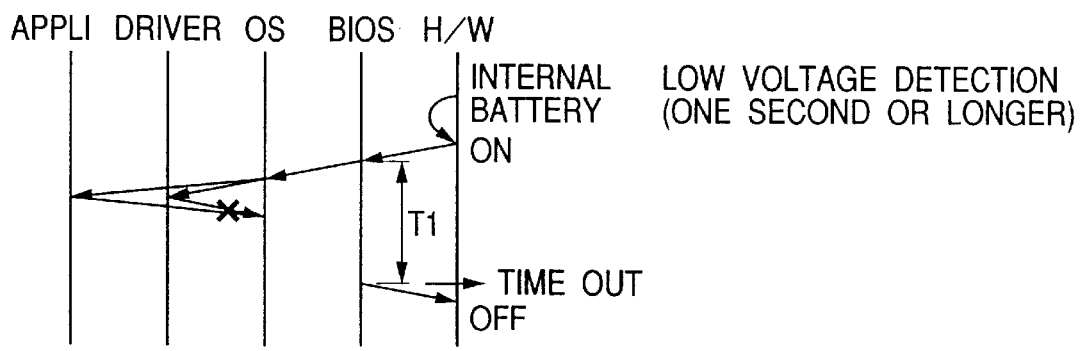
FIG. 21 is a diagram of a fifth exemplary sequence of communications among the hardware devices, the BIOS, the OS, the driver program, and the application program in the on-vehicle computer in FIG. 15.

With reference to FIG. 21, when the power-supply management portion 4B detects that the low internal-battery voltage lasts for at least one second, the power-supply management program controls the power-supply controller 5 and thereby changes the computer to its ON state. In addition, the power-supply management program informs the BIOS of the low power-voltage state and the BIOS transmits the shutting-down-request message to the OS-driver-based application program. It is assumed that a hang-up occurs in the application program or the driver, and hence the OS-driver-based application program does not return the information to the BIOS which indicates that the shutting-down process is permitted. In this case, when the elapsed time indicated by the software timer in the BIOS reaches the predetermined time interval T1, the BIOS transmits the turn-OFF command to the power-supply management portion 4B. The power-supply management portion 4B controls the power-supply controller 5 in response to the turn-OFF command, and thereby changes the computer to its OFF state.

Figure 22:
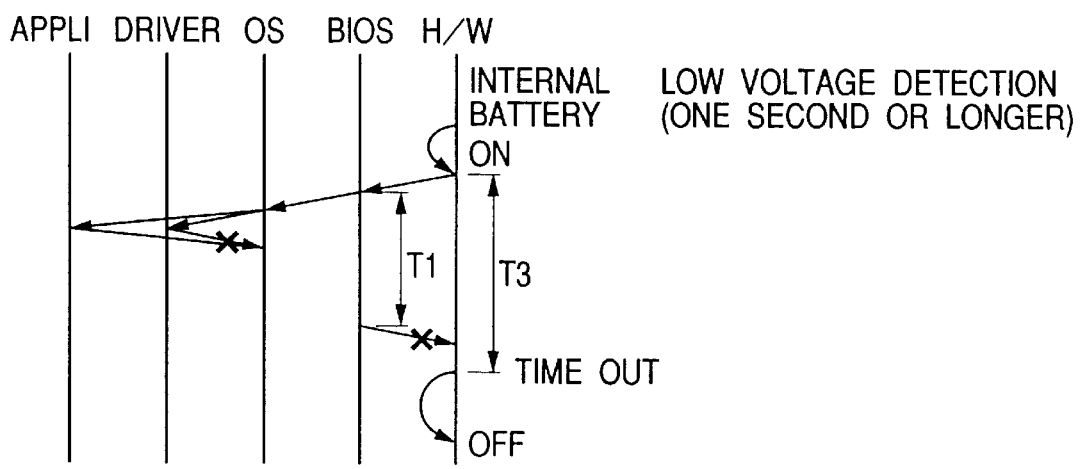
FIG. 22 is a diagram of a sixth exemplary sequence of communications among the hardware devices, the BIOS, the OS, the driver program, and the application program in the on-vehicle computer in FIG. 15.

With reference to FIG. 22, when the power-supply management portion 4B detects that the low internal-battery voltage lasts for at least one second, the power-supply management program controls the power-supply controller 5 and thereby changes the computer to its ON state. In addition, the power-supply management program informs the BIOS of the low power-voltage state and the BIOS transmits the shutting-down-request message to the OS-driver-based application program. It is assumed that a hang-up occurs in the application program or the driver, and hence the OS-driver-based application program does not return the information to the BIOS which indicates that the shutting-down process is permitted. Furthermore, it is assumed that a hang-up occurs in the BIOS. Accordingly, the BIOS does not transmit the turn-OFF command to the power-supply management portion 4B even when the elapsed time indicated by the software timer in the BIOS reaches the predetermined time interval T1. In this case, when the elapsed time indicated by the hardware timer in the power-supply management portion 4B reaches the predetermined time interval T3, the power-supply management portion 4B controls the power-supply controller 5 and thereby changes the computer to its OFF state.

What is claimed is:

1. An on-vehicle computer comprising:

first means for detecting whether or not a vehicle accessory switch changes to its OFF position;

a hardware timer;

second means for starting the hardware timer when the first means detects that the vehicle accessory switch changes to its OFF position;

third means for providing a BIOS timer;

fourth means for transmitting a suspending request from a BIOS to an application program and starting the BIOS timer when the first means detects that the vehicle accessory switch changes to its OFF position;

fifth means for providing an application program timer;

sixth means for returning a suspending permission answer from the application program to the BIOS and starting the application program timer in response to the suspending request;

seventh means for generating a first turn-OFF command when an elapsed time measured by the application program timer reaches a first predetermined time interval (T2);

eighth means for enabling the BIOS to generate a suspending command in response to the suspending permission answer;

ninth means for generating a second turn-OFF command in cases where the sixth means continues to fail to return the suspending permission answer to the BIOS until an elapsed time measured by the BIOS timer reaches a second predetermined time interval (T1);

a main computer portion;

tenth means for turning off power supply to the main computer portion in response to at least one of the first turn-OFF command and the second turn-OFF command; and eleventh means for turning off power supply to the main computer portion in cases where the BIOS continues to fail to generate the suspending command and the seventh means and the ninth means continue to fail to generate the first turn-OFF command and the second turn-OFF command until an elapsed time measured by the hardware timer reaches a third predetermined time interval (T3);

wherein the first predetermined time interval (T2) is longer than the second predetermined time interval (T1), and is shorter than the third predetermined time interval (T3).

2. An on-vehicle computer comprising:

first means for detecting whether or not at least one of a vehicular-battery voltage and an internal-battery voltage continues to be lower than a predetermined reference voltage for a first predetermined time interval;

a hardware timer;

second means for starting the hardware timer when the first means detects that at least one of the vehicular-battery voltage and the internal-battery voltage continues to be lower than the predetermined reference voltage for the first predetermined time interval;

third means for providing a BIOS timer;

fourth means for transmitting a shutting-down request from a BIOS to an application program and starting the BIOS timer when the first means detects that at least one of the vehicular-battery voltage and the internal-battery voltage continues to be lower than the predetermined reference voltage for the first predetermined time interval;

fifth means for returning a shutting-down permission answer from the application program to the BIOS;

sixth means for enabling the BIOS to generate a shutting-down command in response to the shutting-down permission answer;

seventh means for generating a turn-OFF command in cases where the fifth means continues to fail to return the shutting-down permission answer to the BIOS until an elapsed time measured by the BIOS timer reaches a second predetermined time interval (T1);

a main computer portion;

eighth means for turning off power supply to the main computer portion in response to the turn-OFF command; and ninth means for turning off power supply to the main computer portion in cases where the BIOS continues to fail to generate the shutting-down command and the seventh means continues to fail to generate the turn-OFF command until an elapsed time measured by the hardware timer reaches a third predetermined time interval (T3);

wherein the second predetermined time interval (T1) is shorter than the third predetermined time interval (T3).

3. An on-vehicle computer comprising:
first means for detecting whether or not the computer is in its suspended state;
second means means for, in cases where the first means detects that the computer is in its suspended state, detecting whether or not at least one of a vehicular-battery voltage and an internal-battery voltage continues to be lower than a predetermined reference voltage for a first predetermined time interval;
a hardware timer;
third means for starting the hardware timer when the second means detects that at least one of the vehicular-battery voltage and the internal-battery voltage continues to be lower than the predetermined reference voltage for the first predetermined time interval;
fourth means for providing a BIOS timer;
fifth means for transmitting a shutting-down request from a BIOS to an application program and starting the BIOS timer when the second means detects that at least one of the vehicular-battery voltage and the internal-battery voltage continues to be lower than the predetermined reference voltage for the first predetermined time interval;
sixth means for returning a shutting-down permission answer from the application program to the BIOS;
seventh means for enabling the BIOS to generate a shutting-down command in response to the shutting-down permission answer;
eighth means for generating a turn-OFF command in cases where the sixth means continues to fail to return the shutting-down permission answer to the BIOS until an elapsed time measured by the BIOS timer reaches a second predetermined time interval (T1);
a main computer portion;
ninth means for turning off power supply to the main computer portion in response to the turn-OFF command; and
tenth means for turning off power supply to the main computer portion in cases where the BIOS continues to fail to generate the shutting-down command and the eighth means continues to fail to generate the turn-OFF command until an elapsed time measured by the hardware timer reaches a third predetermined time interval (T3);
wherein the second predetermined time interval (T1) is shorter than the third predetermined time interval (T3).

4. An on-vehicle computer comprising:
first means for detecting whether or not a vehicle accessory switch changes to its OFF position;
a main computer portion including a CPU;
second means for enabling the CPU to output a suspending command when the first means detects that the vehicle accessory switch changes to its OFF position; and
third means for cutting off power supply to the main computer portion in cases where the CPU continuously fails to output the suspending command during a predetermined time interval after the first means detects that the vehicle accessory switch changes to its OFF position.

5. An on-vehicle computer comprising:
a power-supply management portion operating in accordance with a first program;
first means provided in the power-supply management portion for detecting whether or not a vehicle accessory switch changes to its OFF position;
a main computer portion including a CPU which operates in accordance with a second program different and separate from the first program;
second means provided in the power-supply management portion for feeding the CPU with information representing that the vehicle accessory switch changes to its OFF position;
third means for enabling the CPU to return a suspending command to the power-supply management portion in response to the information from the second means;
a power-supply controller for controlling power supply to the main computer portion; and
fourth means provided in the power-supply management portion for controlling the power-supply controller to cut off power supply to the main computer portion in cases where the CPU continuously fails to return the suspending command during a predetermined time interval after the first means detects that the vehicle accessory switch changes to its OFF position.

6. An on-vehicle computer comprising:
first means for detecting whether or not a vehicular-battery voltage continues to be lower than a predetermined reference voltage for a first predetermined time interval;
a main computer portion including a CPU;
second means for enabling the CPU to output a shutting-down command when the first means detects that the vehicular-battery voltage continues to be lower than the predetermined reference voltage for the first predetermined time interval; and
third means for cutting off power supply to the main computer portion in cases where the CPU continuously fails to output the shutting-down command during a second predetermined time interval after the first means detects that the vehicular-battery voltage continues to be lower than the predetermined reference voltage for the first predetermined time interval.

7. An on-vehicle computer comprising:
a power-supply management portion operating in accordance with a first program;
first means provided in the power-supply management portion for detecting whether or not a vehicular-battery voltage continues to be lower than a predetermined reference voltage for a first predetermined time interval;
a main computer portion including a CPU which operates in accordance with a second program different and separate from the first program;
second means provided in the power-supply management portion for feeding the CPU with information representing that the vehicular-battery voltage continues to be lower than the predetermined reference voltage for the first predetermined time interval;
third means for enabling the CPU to return a shutting-down command to the power-supply management portion in response to the information from the second means;
a power-supply controller for controlling power supply to the main computer portion; and
fourth means provided in the power-supply management portion for controlling the power-supply controller to cut off power supply to the main computer portion in cases where the CPU continuously fails to return the shutting-down command during a second predetermined time interval after the first means detects that the vehicular-battery voltage continues to be lower than the predetermined reference voltage for the first predetermined time interval.

8. An on-vehicle computer comprising:

first means for detecting whether or not the computer is in its suspended state;

second means means for, in cases where the first means detects that the computer is in its suspended state, detecting whether or not a vehicular-battery voltage continues to be lower than a predetermined reference voltage for a first predetermined time interval;

a main computer portion including a CPU;

third means for enabling the CPU to output a shutting-down command when the second means detects that the vehicular-battery voltage continues to be lower than the predetermined reference voltage for the first predetermined time interval; and fourth means for cutting off power supply to the main computer portion in cases where the CPU continuously fails to output the shutting-down command during a second predetermined time interval after the second means detects that the vehicular-battery voltage continues to be lower than the predetermined reference voltage for the first predetermined time interval.

9. An on-vehicle computer comprising:

a power-supply management portion operating in accordance with a first program;

first means provided in the power-supply management portion for detecting whether or not the computer is in its suspended state;

second means means provided in the power-supply management portion for, in cases where the first means detects that the computer is in its suspended state, detecting whether or not a vehicular-battery voltage continues to be lower than a predetermined reference voltage for a first predetermined time interval;

a main computer portion including a CPU which operates in accordance with a second program different and separate from the first program;

third means provided in the power-supply management portion for feeding the CPU with information representing that the vehicular-battery voltage continues to be lower than the predetermined reference voltage for the first predetermined time interval;

fourth means for enabling the CPU to return a shutting-down command to the power-supply management portion in response to the information from the third means;

a power-supply controller for controlling power supply to the main computer portion; and fifth means provided in the power-supply management portion for controlling the power-supply controller to cut off power supply to the main computer portion in cases where the CPU continuously fails to return the shutting-down command during a second predetermined time interval after the second means detects that the vehicular-battery voltage continues to be lower than the predetermined reference voltage for the first predetermined time interval.

* * * * *